(12) United States Patent
Kamamoto et al.

(10) Patent No.: US 7,993,229 B2
(45) Date of Patent: Aug. 9, 2011

(54) POWER TRANSMISSION CHAIN AND POWER TRANSMISSION ASSEMBLY USING THE SAME

(75) Inventors: Shigeo Kamamoto, Osaka (JP); Nobuki Fukui, Nara (JP); Shinji Yasuhara, Nara (JP); Kazuhisa Kitamura, Nara (JP)

(73) Assignee: JTEKT Corporation, Osaka-Shi (JP)

( * ) Notice: Subject to any disclaimer, the term of this patent is extended or adjusted under 35 U.S.C. 154(b) by 399 days.

(21) Appl. No.: 10/576,029

(22) PCT Filed: Oct. 18, 2004

(86) PCT No.: PCT/JP2004/015372
§ 371 (c)(1),
(2), (4) Date: Apr. 17, 2006

(87) PCT Pub. No.: WO2005/038295
PCT Pub. Date: Apr. 28, 2005

(65) Prior Publication Data
US 2007/0072722 A1    Mar. 29, 2007

(30) Foreign Application Priority Data

Oct. 17, 2003  (JP) ................................. 2003-357218
Apr. 8, 2004   (JP) ................................. 2004-114539

(51) Int. Cl.
*F16G 9/00*    (2006.01)
(52) U.S. Cl. .......................... 474/245; 474/215; 474/217
(58) Field of Classification Search .................. 474/202, 474/215–217, 237, 242, 244, 245, 248; 59/78.1, 59/78, 84, 900
See application file for complete search history.

(56) References Cited

U.S. PATENT DOCUMENTS

| 4,581,001 A |   | 4/1986 | Rattunde et al. |
| 4,718,880 A | * | 1/1988 | Zimmer .................... 474/201 |
| 4,813,918 A |   | 3/1989 | Rattunde et al. |
| 4,911,682 A | * | 3/1990 | Ivey et al. .................... 474/245 |
| 5,242,334 A | * | 9/1993 | Sugimoto et al. ............. 474/215 |

(Continued)

FOREIGN PATENT DOCUMENTS

DE        4429223 C1    8/1995

(Continued)

OTHER PUBLICATIONS

Translation of JP 01-169149, published Jul. 4, 1989, Anpo Yoshida, 11 pages.*

*Primary Examiner* — Bradley T King
*Assistant Examiner* — Thomas Irvin
(74) *Attorney, Agent, or Firm* — Birch, Stewart, Kolasch & Birch, LLP

(57) ABSTRACT

An object of the invention is to provide a power transmission chain capable of effectively reducing noises and a power transmission assembly using the same. In the power transmission chain including plural links each possessing through-holes and plural pins inserted through the through-holes for interconnecting the plural links, all the plural pins substantially have the same longitudinal length while the plural pins include plural types of pins which have mutually different rigidities against force acting in the pin longitudinal direction. Furthermore, a locus of contact position between the pin and a strip is defined by an involute of a circle. The pins and strips are combined to form two or more types of pairs which provide the involutes of base circles having different radii.

21 Claims, 18 Drawing Sheets

U.S. PATENT DOCUMENTS

| | | | |
|---|---|---|---|
| 5,728,021 A | | 3/1998 | Van Rooij et al. |
| 5,941,059 A | * | 8/1999 | Kanehira et al. .................... 59/5 |
| 6,135,908 A | * | 10/2000 | Greiter .......................... 474/215 |
| 6,142,903 A | * | 11/2000 | Heinrich ...................... 474/215 |
| 6,260,345 B1 | * | 7/2001 | Kanehira et al. .................... 59/4 |
| 6,572,504 B2 | * | 6/2003 | Wakabayashi ................ 474/214 |
| 6,811,507 B2 | * | 11/2004 | Baumann et al. ............. 474/215 |
| 7,204,775 B2 | * | 4/2007 | Teubert et al. ................ 474/215 |
| 2001/0046917 A1 | | 11/2001 | Linnenbrugger et al. |
| 2002/0010047 A1 | * | 1/2002 | Kurokawa et al. ............ 474/231 |
| 2002/0077205 A1 | * | 6/2002 | Turner .......................... 474/242 |
| 2002/0107100 A1 | * | 8/2002 | Wakabayashi et al. ........ 474/214 |
| 2003/0036450 A1 | * | 2/2003 | Linnenbrugger et al. .... 474/201 |
| 2005/0187057 A1 | * | 8/2005 | Lou .............................. 474/245 |

FOREIGN PATENT DOCUMENTS

| | | | |
|---|---|---|---|
| GB | 2193783 A | | 2/1988 |
| JP | 63-53337 A | | 8/1986 |
| JP | 01-169149 | * | 7/1989 |
| JP | 1990-071147 | | 5/1990 |
| JP | 7-069001 B2 | | 7/1995 |
| JP | 8-312725 A | | 11/1996 |
| JP | 2001-003996 | | 1/2001 |

* cited by examiner

POWER TRANSMISSION CHAIN AND POWER TRANSMISSION ASSEMBLY USING THE SAME

TECHNICAL FIELD

The present invention relates to a power transmission chain for use in a continuously variable transmission for vehicles, and to a power transmission assembly using the same.

BACKGROUND ART

One type of continuously variable transmission (CVT) for automotive vehicles includes, for example: a drive pulley disposed on an engine side; a driven pulley disposed on a drive-wheel side; and an endless-belt-like chain entrained between these pulleys. One type of the power transmission chain includes: a plurality of links; and a plurality of pins for interconnecting these links. Such a continuously variable transmission of a so-called chain type transmits power by way of traction produced from contact friction force between sheave surfaces and end faces of the pins of the chain, the sheave surfaces defined by two conical surfaces disposed internally of each pulley as substantially opposed each other. An alternative continuously variable transmission has an arrangement wherein chain friction transmission members, as a separate member from the pin, are arranged along a chain longitudinal direction at predetermined space intervals, such that power may be transmitted by way of traction produced from the contact friction force between the opposite end faces of the chain friction transmission members and the sheave surfaces. Furthermore, a distance (groove width) between the conical sheave surfaces of each of the drive pulley and the driven pulley is continuously varied for continuously varying an effective radius of each pulley. As a result, speed change ratio is continuously varied (infinitely variable). Thus is provided smooth gearless shift transmission, which is not provided by a conventional gear-type transmission.

In such a chain-type continuously variable transmission, uncomfortable noises are produced when the pins or the like of the entrained chain approach the sheave surfaces of each pulley or when the pins or the like leave the sheave surfaces. Particularly when the pins approach the sheave surfaces, the pins collide with the sheave surfaces to produce the noises. A plurality of pins are arranged along the chain longitudinal direction with a predetermined pitch and hence, these pins sequentially collide with the sheave surfaces to produce the noises.

Since a normal chain includes the plural pins having the same length, all the pins collide with the sheave surfaces the same way. Accordingly, the noises resulting from the collision of the individual pins substantially have the same frequency, so that the noise at this frequency is increased to raise a sound pressure level. In this connection, Japanese Unexamined Patent Publication No.S63(1988)-53337 discloses an invention wherein a plurality of pins having different lengths are used for dispersing the frequencies of the produced noises or suppressing resonance, thereby lowering the sound pressure level.

On the other hand, Japanese Unexamined Patent Publication No.H8(1996)-312725 discloses a power transmission chain for use in continuously variable transmission. The chain includes: a plurality of links each possessing first and second through-holes arranged in the chain longitudinal direction; and a plurality of pins and a plurality of inter-pieces, each of which pins and inter-pieces penetrates the first through-hole of one link and the second through-hole of the other link thereby interconnecting the links, adjoining in a chain widthwise direction, in a manner to provide bending in the chain longitudinal direction; and is arranged such that the pin fixed in the first through-hole of the one link and movably fitted in the second through-hole of the other link and the inter-piece movably fitted in the first through-hole of the one link and fixed in the second through-hole of the other link are brought into relative movement in rolling contact thereby permitting the bending of the chain, and that an involute of a circle defines a sectional shape a contact portion of a pin side surface, at which the pin contacts the inter-piece.

DISCLOSURE OF THE INVENTION

However, the above invention as disclosed in Japanese Unexamined Patent Publication No.S63(1988)-53337 has a drawback that the longer pins are more intensively worn than the shorter pins. That is, the longer pins become shorter as intensively worn so that the length difference between the longer pins and the shorter pins is gradually decreased. As used longer, therefore, the power transmission chain is gradually reduced in noise reduction effect, thus failing to offer an adequate effect. Since the longer pins are subjected to a greater force than the shorter pins, load is concentrated on the longer pins, which are reduced in durability. In addition, a chain assembly process includes management of the pins of different lengths and steps of sorting the pins before assembling the pins. Hence, the number of assembly steps is increased to increase costs.

The power transmission chain disclosed in Japanese Unexamined Patent Publication No.H8(1996)-312725 reduces the noises during operation by suppressing polygonal vibrations resulting from its structure, which is not constituted by a single continuous body but is formed by interconnecting the plural links. In cases where, for example, a continuously variable transmission using this power transmission chain is mounted in an automotive vehicle, the vehicle is required to further reduce the noises of the power transmission chain for achieving the highest possible silence performance during drive.

In view of the foregoing, the invention has been accomplished and has an object to provide a power transmission chain capable of effectively reducing the noises.

More specifically, a first object of the invention is to provide a power transmission chain which includes the pins substantially having the same length and which is adapted for effective reduction of the noises. A second object of the invention is to provide a power transmission chain adapted for effective reduction of the noises during drive by further reducing the noises resulting from the polygonal vibrations, and to provide a power transmission assembly using the same.

According to a first aspect of the invention particularly for achieving the above first object thereof, a power transmission chain comprising a plurality of links each possessing through-holes and a plurality of pins inserted through the through-holes for interconnecting the plural links; used as entrained between a first pulley possessing conical sheave surfaces and a second pulley possessing conical sheave surfaces; and operating to transmit power by way of contact between opposite end faces of the pins and the sheave surfaces of the first and second pulleys, the power transmission chain is characterized in that all the plural pins substantially have the same length in the longitudinal direction thereof, while the plural pins include plural types of pins which have mutually different rigidities against force acting in the longitudinal direction thereof. In such an arrangement, the sound pressure level of the noises is lowered by the plural pins having the mutually different rigidities, although the pins substantially have the same length. The principles of noise reduction will be specifically described hereinlater.

That the pins substantially have the same length in the longitudinal direction thereof means that the longitudinal lengths of plural pins to be formed in the same length by a normal method have errors within tolerances.

According to another mode of the first aspect of the invention, a power transmission chain comprising a plurality of links and a plurality of pins for interconnecting these links; used as entrained between a first pulley possessing conical sheave surfaces and a second pulley possessing conical sheave surfaces; and operating to transmit power by way of contact between opposite end faces of the pins and the sheave surfaces of the first and second pulleys, the power transmission chain is characterized in that all the plural pins substantially have the same length in the longitudinal direction thereof, while the plural pins include plural types of pins which have mutually different sectional shapes or sectional areas as determined on section perpendicular to the longitudinal direction thereof. In such an arrangement, the sound pressure level of the noises is lowered by the plural pins having the mutually different rigidities just as in the above mode of the invention, although the pins substantially have the same length. The principles of noise reduction will be specifically described hereinlater.

That the pins have mutually different sectional shapes or sectional areas means as follows. When a pair of pins are compared with respect to the sectional shapes or sectional areas thereof as determined on the respective sections thereof taken at the respective corresponding positions in the pin longitudinal direction, these pins are determined to have the different sectional shapes or sectional areas if the sections of one pin include at least one different sectional shape or sectional area from any of those of the other pin.

According to the above first aspect of the invention, an arrangement may also be made such that each of the plural pins substantially has the same sectional shape and sectional area as determined at any points of the overall longitudinal length thereof, while the plural pins include plural types of pins which have the mutually different sectional areas. In this case, the pin configuration is simplified as compared with a case where the pin is varied in the sectional shape or sectional area at longitudinal positions thereof. Hence, the pins may be manufactured easily.

In the above mode of the invention wherein the pins have the mutually different sectional areas, an arrangement may also be made such that the plural pins include plural types of pins, the sections of which have mutually different widths with respect to a chain longitudinal direction, whereas the plural links include plural types of links which have mutually different pitches, and that a link having the greater pitch is penetrated by a pin having the greater width with respect to the chain longitudinal direction. In such an arrangement, the pin may be inserted through the link having the length corresponding to the chain-longitudinal width of the pin. This facilitates the design of a chain including the plural types of pins and the different pitches.

The term "pitch", as used herein, means a chain-longitudinal distance between the pins inserted through one link. The pitch is defined by a pin-to-pin distance as determined with respect to respective contact points between the pin and the strip. This pitch is measured in a state where the chain is not bent (as stretched straight).

According to the above first aspect of the invention, it is preferred that out of the plural types of pins which have the mutually different sectional areas, a sectional area of the thickest pin is 1.1 times or more and twice or less the sectional area of the thinnest pin. If this factor is less than 1.1, the differentiation in sectional areas may not offer an adequate effect. If this factor is more than 2, the chain-longitudinal distance between the pins (pitch) is increased so much that the noises tend to increase. However, the invention obviates such problems.

According to a second aspect of the invention particularly for achieving the above second object thereof, a power transmission chain used as entrained between a first pulley possessing conical sheave surfaces and a second pulley possessing conical sheave surfaces and operating to transmit power by way of contact between opposite end faces of plural chain friction transmission members and the sheave surfaces of the first and second pulleys, the chain friction transmission members arranged along a chain longitudinal direction at predetermined space intervals, the power transmission chain comprises a plurality of links each possessing first and second through-holes arranged in the chain longitudinal direction, and a plurality of first pins and a plurality of second pins, each of which penetrates the first through-hole of one link and the second through-hole of the other link thereby interconnecting the links, adjoining in a chain widthwise direction, in a manner to provide bending in the chain longitudinal direction, and is characterized in that the first pin fixed in the first through-hole of the one link and movably fitted in the second through-hole of the other link and the second pin movably fitted in the first through-hole of the one link and fixed in the second through-hole of the other link are brought into relative movement in rolling contact thereby permitting the bending of the chain, that a locus of contact position between the first pin and the second pin is defined by an involute of a circle and the first pins and the second pins are combined to form two or more types of pairs which provide the involutes of base circles having different radii, and that the plural chain friction transmission members include plural types of chain friction transmission members which have mutually different rigidities against force acting in the chain widthwise direction.

In such an arrangement, the locus of the contact position between the first pin and the second pin is defined by the involute of circle, whereby the polygonal vibrations are suppressed. Furthermore, the first pins and the second pins are combined to form two or more types of pairs providing the involutes of the base circles of different radii, so that the resonance of the polygonal vibrations is suppressed. Thus, the noise reduction effect based on the involute may be further enhanced. In addition, the plural types of chain friction transmission members having the mutually different rigidities are provided for dispersing the frequencies of the noises produced by the chain friction transmission members colliding with the sheave surfaces. Thus, the sound pressure level of the noises is reduced in the peak value.

The second aspect of the invention may also be arranged such that all the chain friction transmission members substantially have the same length in the longitudinal direction thereof. Such an arrangement minimizes intensive wear at the end faces of some chain friction transmission members and hence, the power transmission chain may be able to maintain good performances over a comparatively long period of time.

That the chain friction transmission members substantially have the same length in the longitudinal direction thereof means that the longitudinal lengths of plural chain friction transmission members to be formed in the same length by a normal method have errors within tolerances.

The second aspect of the invention may also be arranged such that the plural chain friction transmission members include plural types of chain friction transmission members which have mutually different sectional shapes or sectional areas as determined on section perpendicular to the chain widthwise direction.

In such an arrangement, it is easy to differentiate the rigidities of the chain friction transmission members.

That the chain friction transmission members have mutually different sectional shapes or sectional areas means as follows. When a pair of chain friction transmission members are compared with respect to the sectional shapes or sectional areas thereof as determined on the respective sections thereof taken at respective corresponding positions in the chain widthwise direction, these chain friction transmission members are determined to have the different sectional shapes or sectional areas if the sections of one chain friction transmission member include at least one different sectional shape or sectional area from any of those of the other chain friction transmission member.

The second aspect of the invention may also be arranged such that the first pin or the second pin is a transmission pin also serving as the chain friction transmission member. Such an arrangement negates the need for providing the chain friction transmission member separately from the pin. Hence, the number of components of the power transmission chain is decreased so that the assembly process is simplified.

The second aspect of the invention may also be arranged such that the plural transmission pins include plural types of transmission pins which have mutually different chain-longitudinal widths as determined on section perpendicular to a pin-longitudinal direction, and that the plural links include plural types of links which have mutually different pitches. In this case, the chain may have an arrangement wherein a link having the greater pitch is penetrated by a transmission pin having the greater width with respect to the chain longitudinal direction. Hence, the transmission pin may be inserted through the link having the length corresponding to the chain-longitudinal width of the transmission pin. This facilitates the design of the chain including the plural types of transmission pins and the different pitches.

Since the links have different pitches, the chain longitudinal pitches of the transmission pins, as the friction transmission member, may be varied easily. In the case where the transmission pins have the different chain-longitudinal pitches, the transmission pins also have different contact pitches with respect to the pulley. Hence, the period of sounds produced by the transmission pins contacting the pulley is dispersed, so that the peak value of the sound pressure level of the noises is lowered. In the arrangement wherein the link having the greater pitch is penetrated by the transmission pin having the greater width with respect to the chain longitudinal direction, the transmission pins may be easily varied in the pitch as well as in the rigidity against the force acting in the chain widthwise direction. This leads to a further enhanced noise reduction effect.

The term "pitch", as used herein, means the chain-longitudinal distance between the pins inserted through one link. The pitch is defined by a pin-to-pin distance as determined with respect to respective contact points between the first pin and the second pin. This pitch is adjusted based on the distance between the first through-hole and the second through-hole formed in one link. Furthermore, this pitch is measured in a state where the chain is not bent (as stretched straight).

According to the invention, a power transmission assembly comprises: a first pulley possessing conical sheave surfaces; a second pulley possessing conical sheave surfaces; and a power transmission chain entrained between the first and second pulleys, and is characterized in that the power transmission chain comprises any one of those set forth in the first or second aspect of the invention.

Since this arrangement employs any one of the aforementioned power transmission chains, the power transmission assembly may feature the working effects of the aforementioned chains, such as noise reduction during operation.

According to the second aspect of the invention, in the case where either one of the first pin and the second pin is the transmission pin, either the first pin or the second pin which constitutes the transmission pin is generally referred to as the "pin", whereas the other pin not constituting the transmission pin is generally referred to as the "strip" or "inter-piece". Hereinafter, therefore, either the first or second pin which constitutes the transmission pin will be referred to simply as the "pin", whereas the other pin which does not constitute the transmission pin will be referred to as the "strip".

As described above, the power transmission chain and power transmission assembly according to the invention are adapted for effective noise reduction. According to the first aspect of the invention, in particular, the noises may be effectively reduced by means of the pins having the different rigidities or sectional areas but substantially having the same length. According to the second aspect of the invention, the first pins and the second pins are combined to form two or more types of pairs providing the involutes of the base circles having the different radii, the involute defining the locus of contact position between the first pin and the second pin. Furthermore, the chain friction transmission members have the different rigidities. Therefore, the polygonal vibrations are reduced while the peak value of the sound pressure level of the noises is lowered.

BEST MODE FOR CARRYING OUT THE INVENTION

The preferred embodiments of the invention will hereinbelow be described with reference to the accompanying drawings.

Figure 1:
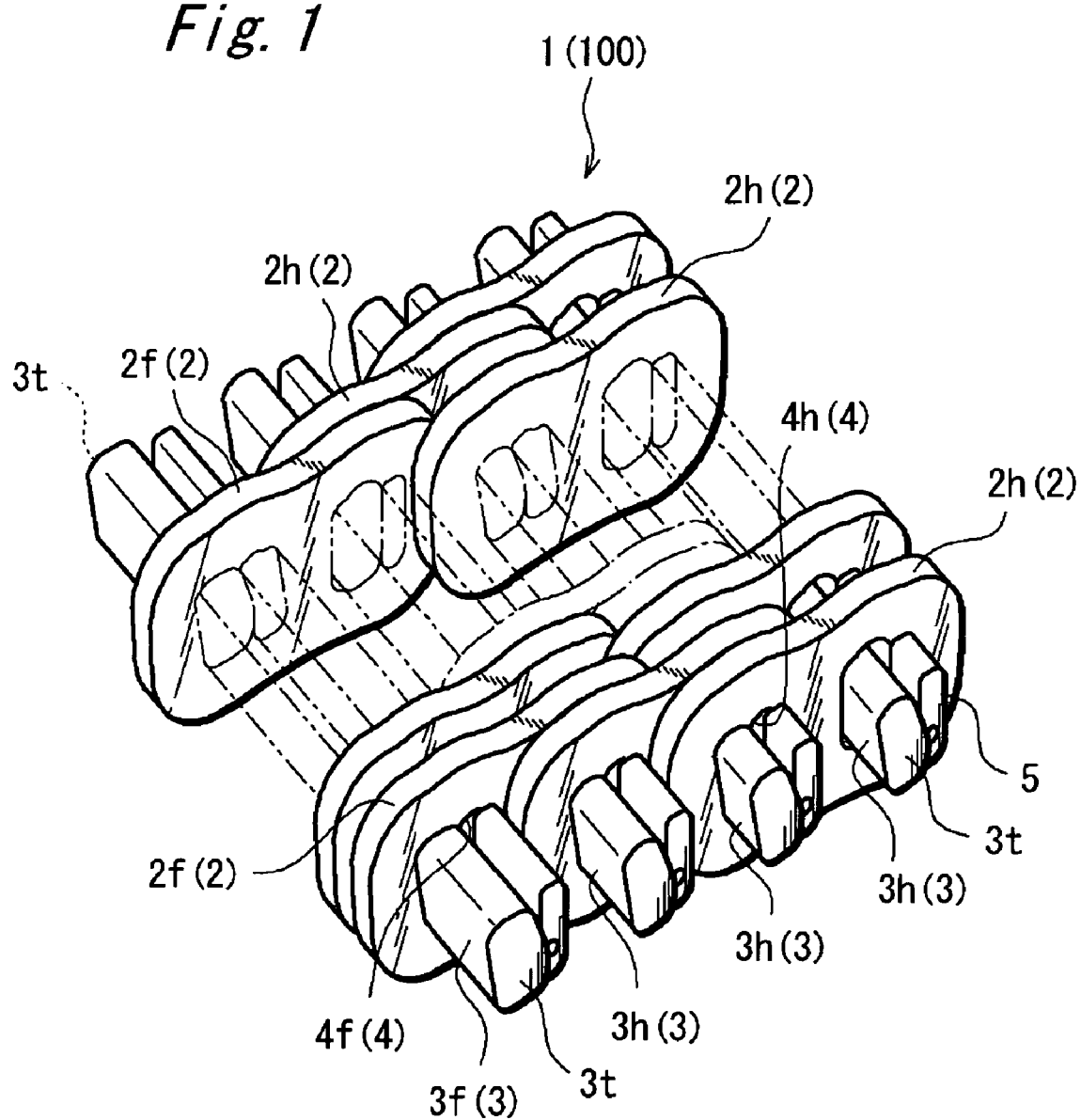
FIG. 1 is a perspective view schematically showing an essential part of a chain for use in chain-type continuously variable transmission according to one embodiment of first and second aspects of the invention.

FIG. 1 is a perspective view schematically showing an essential part of a chain for use in a chain-type continuously variable transmission (hereinafter, simply referred to as "chain") according to one embodiment of a first aspect of the invention. A chain 1 according to the embodiment is generally shaped like an endless belt and includes: a plurality of metallic links 2; a plurality of metallic pins 3 for interconnecting these links 2; and a plurality of strips 5 slightly shorter than the pins 3 with respect to a pin longitudinal direction. The links 2 and pins 3 are formed from a metal such as a bearing steel. FIG. 1 omits the depiction of some links substantially defining a widthwise central portion of the chain 1.

Figure 6:
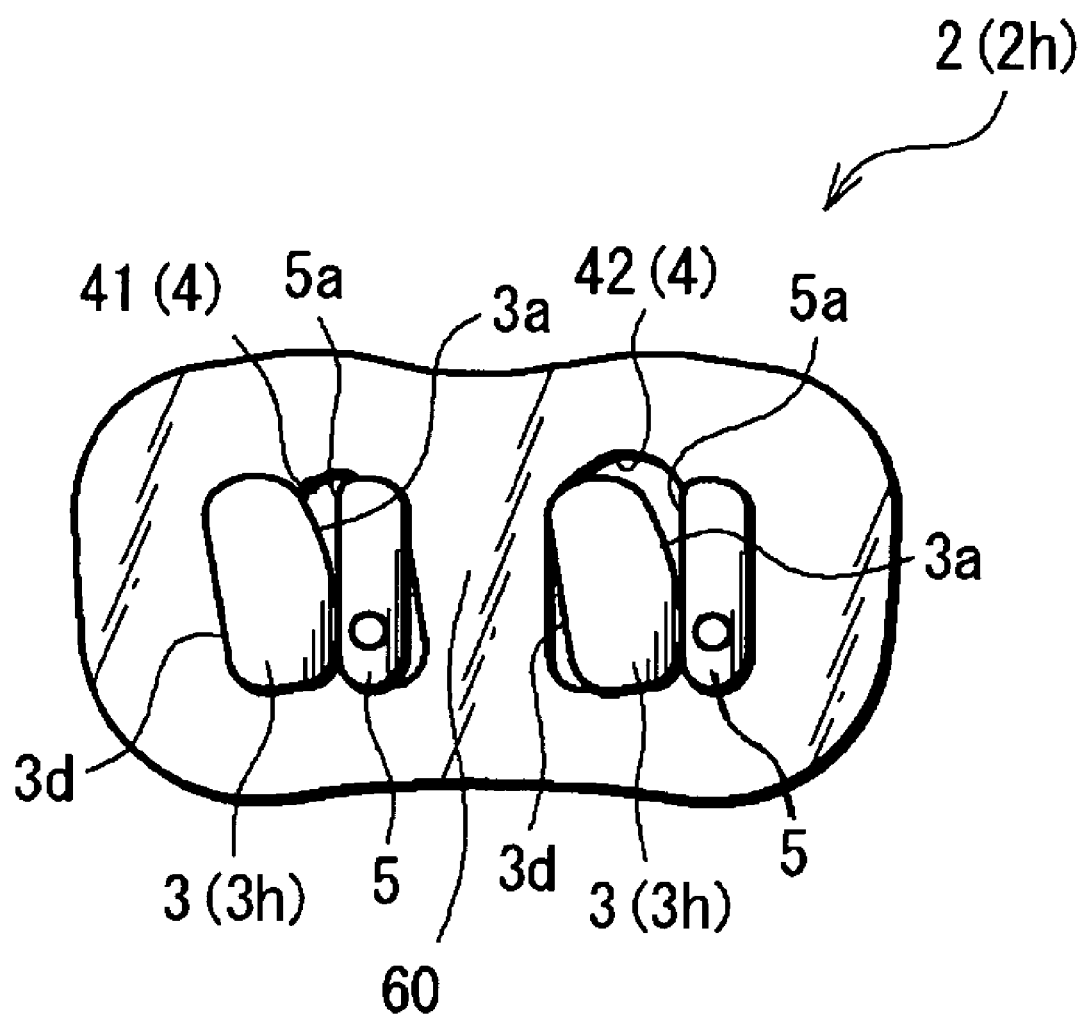
FIG. 6 is a side view of the link of the chain shown in FIG. 1, the link having pins and strips inserted therethrough.
Figure 7:
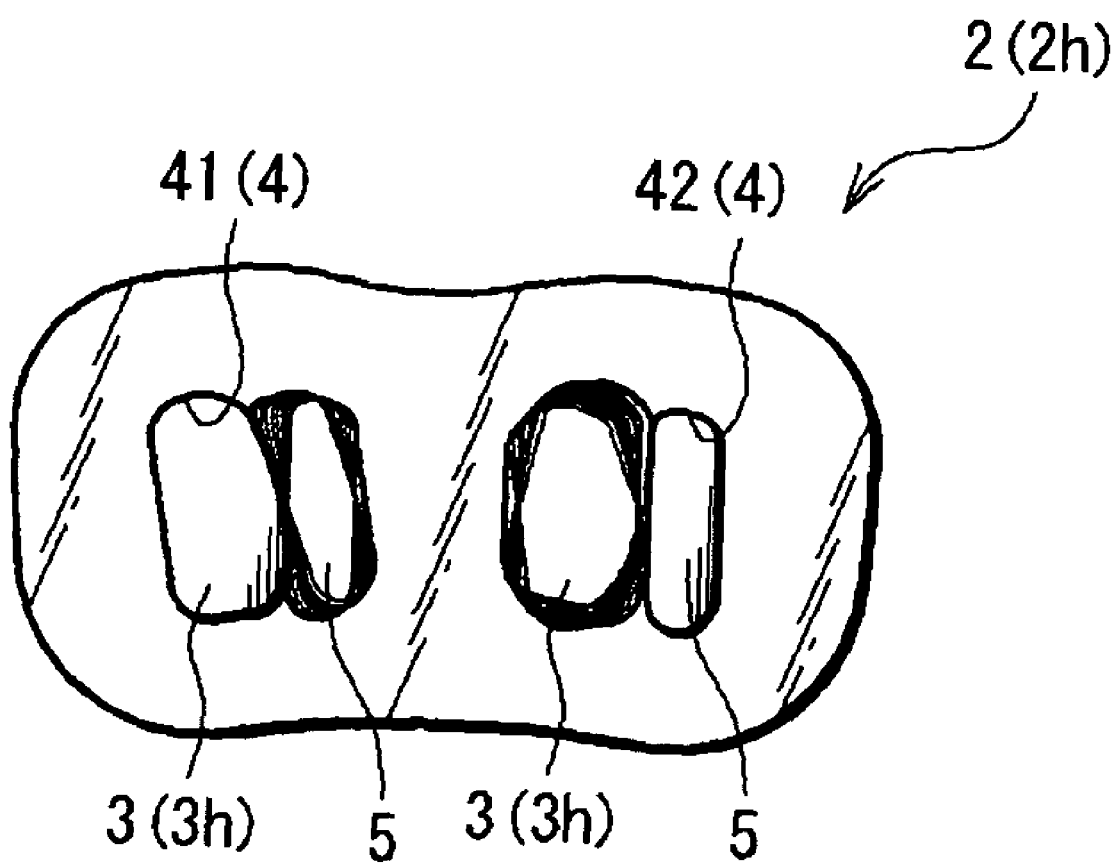
FIG. 7 illustrates how the pins and strips in the chain of FIG. 1 are moved in rolling contact.

As shown in FIG. 1, FIG. 6 and FIG. 7, an individual link 2 has an outside shape formed by a substantially rectangular sheet member rounded off at the corners thereof. Furthermore, the link possesses two through-holes 4 (first through-hole 41 and second through-hole 42) juxtaposed to each other along a longitudinal direction thereof (coinciding with a chain longitudinal direction). One through-hole 4 has one strip 5 and one pin 3 inserted therethrough. A plural number of links 2 are arranged in a chain widthwise direction in an overlapping relation, while a plural number of links 2 are arranged as shifted relative to one another in the chain longitudinal direction. A plural number of links 2 are mutually interconnected by inserting one pin 3 through the through-holes 4 of the links arranged in the chain widthwise direction in overlapping relation as shifted relative to one another with respect to the chain longitudinal direction. Thus, the links form the chain 1 in the form of the endless belt.

An end face 35 of the pin 3 is located outwardly of an end face of the strip 5 with respect to the chain widthwise direction. This projected pin 3 contacts a sheave surface of a pulley.

Figure 15:
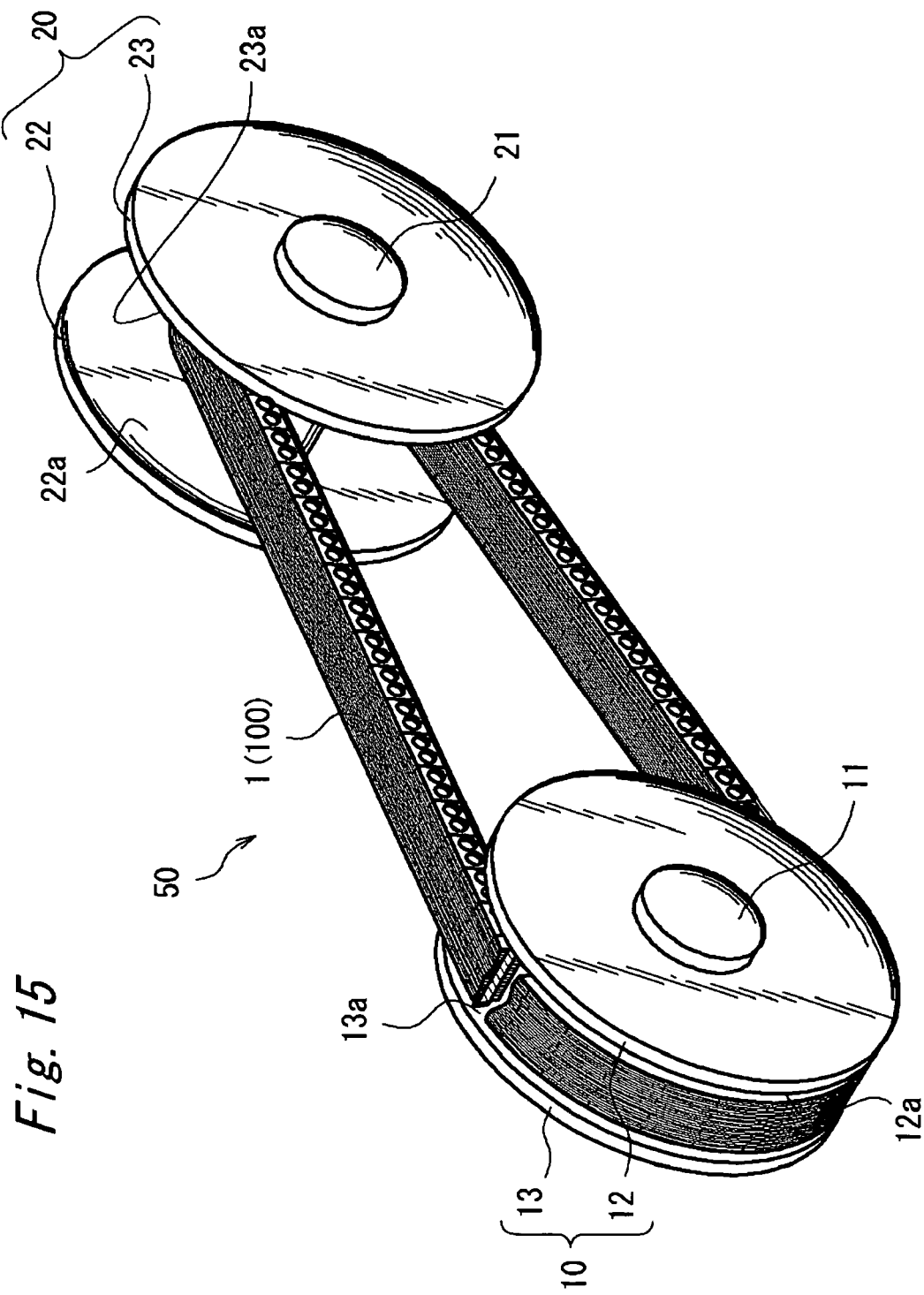
FIG. 15 is a perspective view schematically showing an arrangement of a chain-type continuously variable transmission employing a chain according to one embodiment of the invention.

FIG. 15 is a perspective view schematically showing an arrangement of a chain-type continuously variable transmission 50 as one embodiment of a power transmission assembly of the invention, which includes the chain of the invention. The chain-type continuously variable transmission 50 may be used, for example, as an automotive transmission. The transmission 50 includes: a metallic drive pulley 10 as a first pulley; a metallic driven pulley 20 as a second pulley; and the endless-belt-like chain 1 entrained between these pulleys 10, 20. The pulleys 10, 20 are formed from a metal such as a bearing steel. In FIG. 15, the chain is depicted partly in section for clarity sake.

As shown in FIG. 1, the pin 3 and the strip 5 are bar-like members having substantially rectangular sections. The sectional shapes of the pin and strips and a configuration of the through-hole 4 are designed to provide bending (hereinafter, referred to as "circumferential bending") to permit the chain 1 to be looped over the circular pulley. One side surface of the pin 3 partially contacts one side surface of the strip 5 adjoining thereto, while the status of contact between these side surfaces varies according to the circumferential bending of the chain 1. A mode of such a contact is a rolling/sliding contact. That is, the mode of contact includes rolling contact, sliding contact and combination of these contact modes. Among these contact modes, particularly preferred is the rolling contact mode. In this contact mode, vibrations and noises associated with the operation of the chain 1 may be effectively reduced. It is preferred that either one of the one side surfaces of the pin 3 and the adjoining strip 5 is formed with crowning (convexed surface) extended in the chain widthwise direction, whereas the other side surface is not formed with the crowning extended in the chain widthwise direction but is formed flat.

Since the pin 3 and the strip 5 contact each other in this manner, the pin 3 is scarcely rotated about its axis when clamped between the sheave surfaces of the pulley. This reduces friction loss and ensures high power transmission efficiency.

Figure 16:
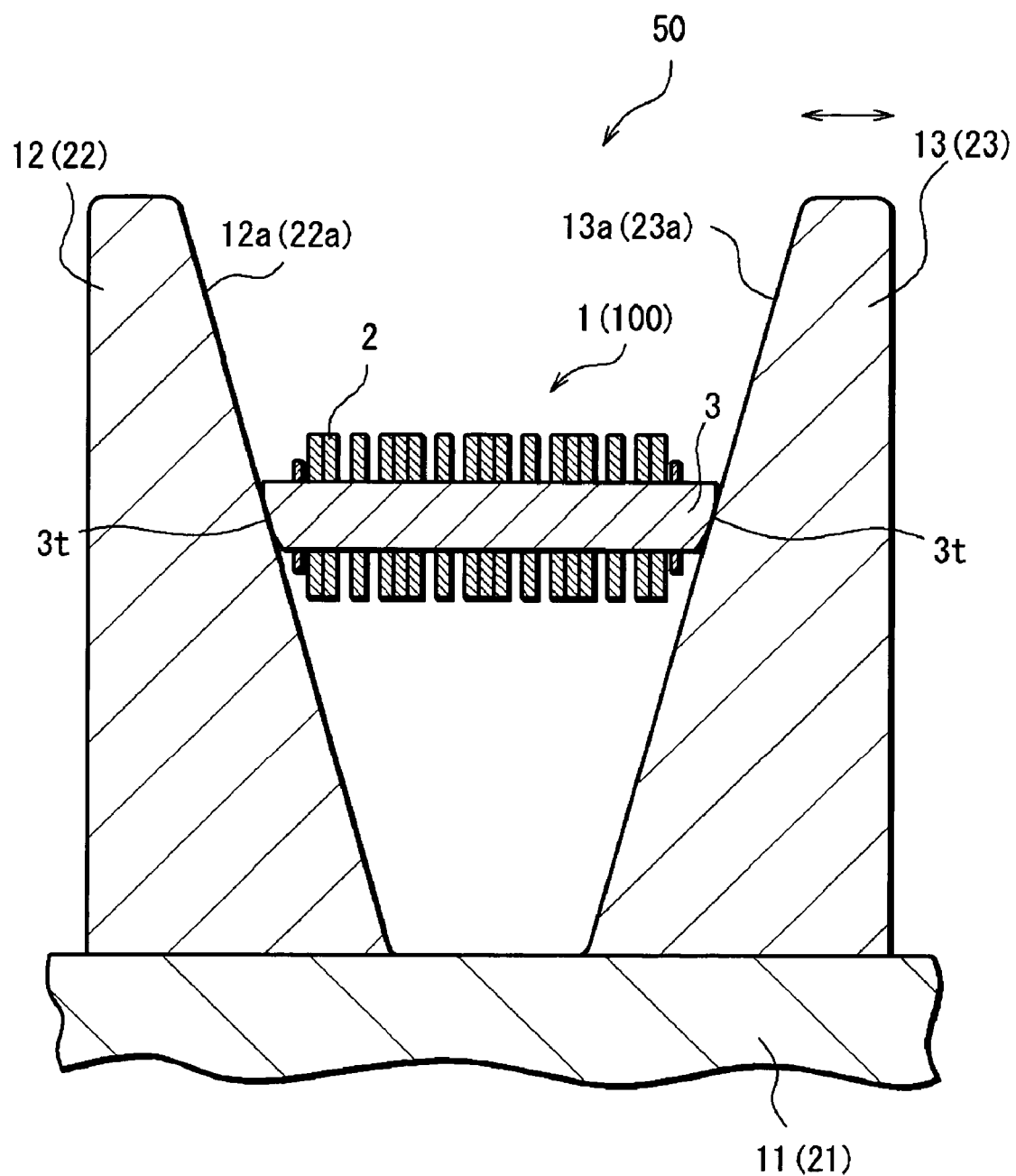
FIG. 16 is a sectional view showing a pulley of the continuously variable transmission of FIG. 15.

FIG. 16 is a sectional view showing the pulley 10 or 20 of the continuously variable transmission 50 (the section taken along a diametrical direction of the pulley 10, 20). As shown in the figure, the end faces 3t of the pin 3 of the chain 1 contact conical sheave surfaces 12a, 13a (22a, 23a) of the pulley 10 (20), which define inside surfaces of the pulley as opposing each other. Thus, the chain transmits traction produced from contact friction force associated with the contact between the end faces of the pin and the sheave surfaces.

Figure 2:
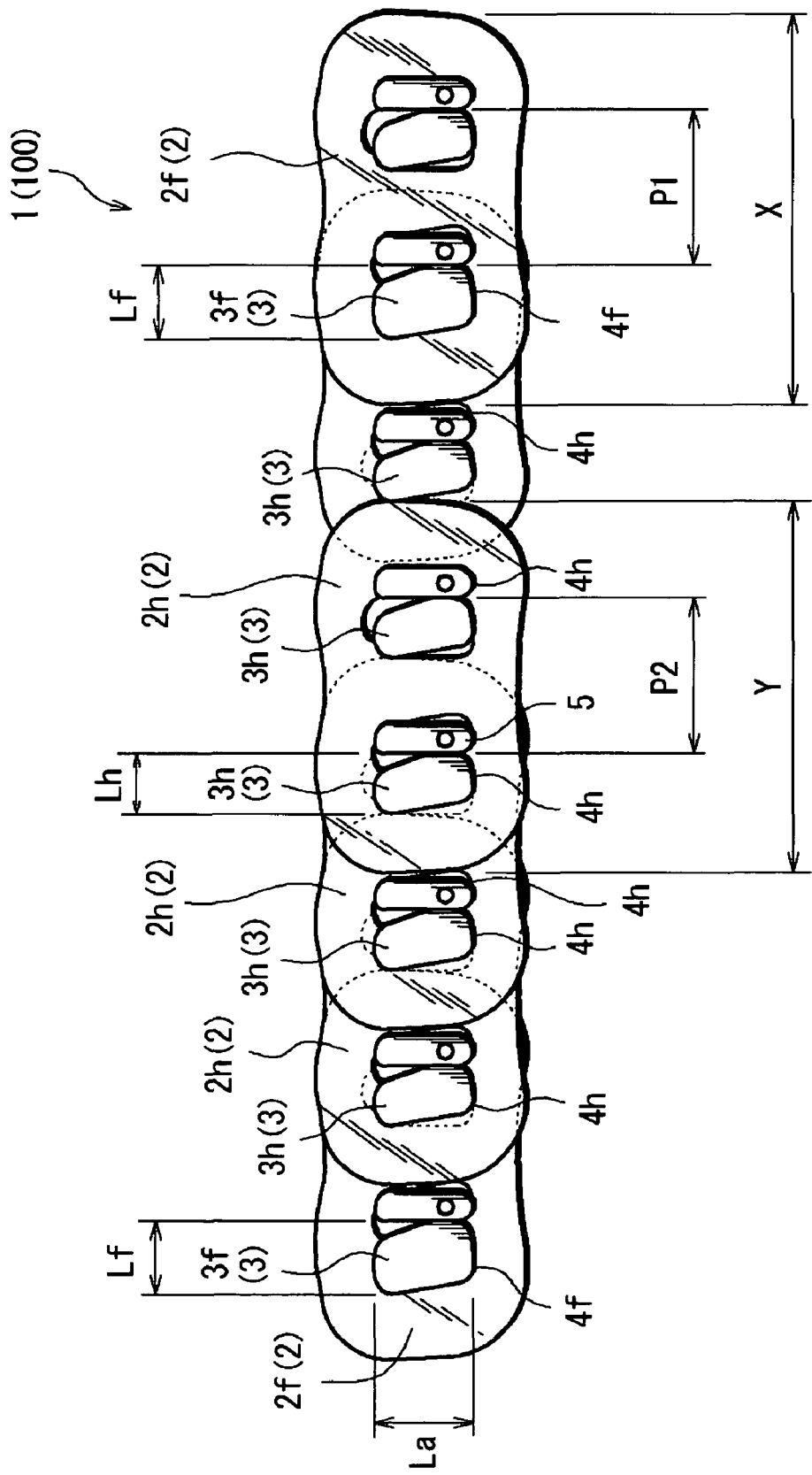
FIG. 2 is a side view of the chain shown in FIG. 1.

As seen in FIG. 2 showing the chain in side elevation, the pin 3 includes two types of pins 3f, 3h having different sectional areas. The pin 3f has a relatively larger area of section perpendicular to the longitudinal direction thereof, whereas the pin 3h has a relatively smaller area of the section. The greater pin 3f and the thinner pin 3h substantially have the same length in the longitudinal direction thereof. That the pins substantially have the same length in the longitudinal direction thereof means that the longitudinal lengths of plural pins to be formed in the same length by a normal method have errors within tolerances. For instance, difference in the longitudinal lengths of the pins is defined to be 60 μm or less.

The greater pin 3f and the thinner pin 3h are each configured such that the pin has the same sectional shape as determined at any points of the longitudinal length thereof (determined on sections perpendicular to the longitudinal direction thereof and will be hereinafter referred to simply as "sectional shape") and has a constant sectional area as determined at any points of the overall longitudinal length thereof (determined on sections perpendicular to the longitudinal direction thereof and will be hereinafter referred to simply as "sectional area"). That is, each of the pins substantially has the same sectional shape and sectional area as determined at any points of the longitudinal direction thereof.

As shown in FIG. 2, the sectional shape of the greater pin 3f is defined by expanding the sectional shape of the thinner pin 3h in the chain longitudinal direction. When the sectional shapes of the greater pin 3f and the thinner pin 3h mounted in the chain 1 are compared, these pins substantially have the same width with respect to a thickness direction of the chain (the vertical direction as seen in FIG. 2). However, the greater pin 3*f* has a greater chain-longitudinal width Lf than a chain-longitudinal width Lh of the thinner pin 3*h*.

When the sectional areas of the greater pin 3*f* and the thinner pin 3*h* are compared, the sectional area of the greater pin 3*f* is 1.1 times to twice as large as that of the thinner pin 3*h*.

The through-hole 4 of the link 2 is configured to correspond to the respective shapes of the greater pin 3*f* and the thinner pin 3*h*. Specifically, a greater through-hole 4*f* penetrated by the greater pin 3*f* is greater than a thinner through-hole 4*h* penetrated by the thinner pin 3*h*. The right and left through-holes 4 in one link 2 have mutually different configurations such as to permit the chain 1 to be circumferentially bent. When the term, the greater through-hole 4*f* or the thinner through-hole 4*h* is used herein, such a difference in the configuration is disregarded and all the through-holes 4 penetrated by the greater pins 3*f* are referred to as the greater through-hole 4*f* whereas all the through-holes 4 penetrated by the thinner pins 3*h* are referred to as the thinner through-hole 4*h*.

The chain 1 also employs plural types of links 2. As shown in FIG. 2, the link 2 includes a long link 2*f* possessing the greater through-hole 4*f*, and a short link 2*h* free from the greater through-hole 4*f*. In the long link 2*f*, one of the two through-holes 4 is the greater through-hole 4*f* whereas the remainder is the thinner through-hole 4*h*. In the short link 2*h*, on the other hand, both of the two through-holes 4 are the thinner through-holes 4*h*.

A pitch P1 of the long link 2*f* is longer than a pitch P2 of the short link 2*h*. In correspondence to these pitches P1, P2, a chain-longitudinal length X of the long link 2*f* is greater than a chain-longitudinal length Y of the short link 2*h*.

The chain 1 having the above arrangement offers the following working effects.

Since the greater pin 3*f* and the thinner pin 3*h* substantially have the same length in the longitudinal direction thereof, wear concentration on a certain pin 3 may be obviated.

Because of the different sectional areas of the greater pin 3*f* and the thinner pin 3*h*, the chain-type continuously variable transmission 50 may be reduced in noises produced during operation. The principles of noise production are as follows.

In the chain-type continuously variable transmission 50 shown in FIG. 15, when the chain 1 approaches the sheave surfaces 12*a*, 13*a*, 22*a*, 23*a* of the pulleys 10, 20, the pins 3 of the chain 1 collide with these sheave surfaces to press the sheave surfaces. In reaction, the end faces 3*t* of the pins 3 are pressed back by the sheave surfaces, so that the pins 3 are deformed under force acting to compress the pins in the longitudinal direction thereof (the deformation will be hereinafter referred to as "compressive deformation"). The pins 3 are elastically deformed by this force and thereafter, are so deformed as to restore to their original shapes (this deformation will be hereinafter referred to as "restorative deformation"). During the restorative deformation, the pins press the sheave surfaces 12*a*, 13*a*, 22*a*, 23*a* again. This brings the pulleys 10, 20 into vibrations, which produce the noises. While there are other causative factors of the noises, the noises based on the above principles are the most significant.

The chain 1 of the embodiment includes a few types of pins 3 which have different sectional areas as determined on section perpendicular to the longitudinal direction thereof, namely, the greater pin 3*f* and the thinner pin 3*h*. In the aforementioned principles of noise production, the greater pin 3*f* and the thinner pin 3*h* differ in the magnitude of pressing force on the sheave surface or time to press the sheave surface. Particularly, the greater pin 3*f* and the thinner pin 3*h* differ in the mode of the aforesaid restorative deformation. Hence, the greater pin and the thinner pin in the restorative deformation apply the different pressing forces to the individual sheave surfaces or apply the pressing forces in different timings. Accordingly, the frequencies of the noises from the pulleys 10, 20 are dispersed so that a peak value of sound pressure level of the noises may be lowered. In addition, resonance between the pulleys 10, 20 may also be suppressed. Consequently, the chain-type continuously variable transmission 50 may be reduced in the noises during operation.

The greater pin 3*f* and the thinner pin 3*h* each have the same sectional shape and the same sectional area as determined at any points of the longitudinal direction thereof. That is, each of the pins is designed to have the same sectional shape and the same sectional area at any points of the longitudinal direction thereof. Since the individual pins have relatively simple configurations, the pins are easy to manufacture.

When the sectional shapes of the greater pin 3*f* and the thinner pin 3*h* mounted in the chain 1 are compared, these pins substantially have the same length with respect to the chain thickness direction (the vertical direction as seen in FIG. 2). However, the greater pin 3*f* has a greater chain-longitudinal width Lf than a chain-longitudinal width Lf of the thinner pin 3*h*.

The link 2 is designed to have the pitch corresponding to the sectional shapes of the pins 3*f*, 3*h*. Specifically, the link 2 penetrated by the greater pin 3*f* is formed with the greater through-hole 4*f*, as the larger through-hole 4, in correspondence to the greater pin 3*f*. This link is the long link 2*f* having the greater pitch in correspondence to the greater through-hole 4*f*.

In this embodiment, the links also have different chain-longitudinal lengths in correspondence to the different pitches.

As described above, the plural types of links 2 having the different pitches are used, while the link having the greater pitch is penetrated by the pin having the greater chain-longitudinal width. This facilitates the design of the chain 1. In the case where the plural types of pins are used to reduce the noises as described above, the plural types of pins 3 are previously manufactured by merely varying the chain-longitudinal width of the pin section. Then, the pitches of the individual links are varied properly in correspondence to the pin widths. This makes it easy to design the chain 1 having different pitches and different chain-longitudinal widths of the pin section 3. Furthermore, the longitudinal length of the chain itself is varied in correspondence to the difference in the pitch and in the chain-longitudinal width of the pin. Thus, the design of the chain 1 is facilitated as compared with a case where, for example, the vertical width of the pin section (with respect to the chain thickness direction) is varied.

When the sectional areas of the greater pin 3*f* and the thinner pin 3*h* are compared, the sectional area of the greater pin 3*f* is defined to be 1.1 times to twice the sectional area of the thinner pin 3*h*. If this factor is less than 1.1, the difference in the sectional areas of the plural types of pins is so small that the aforesaid noise reduction effect may become insufficient. If this factor is more than two, the pin-to-pin distance (pitch) in the chain-longitudinal direction tends to be increased so much that the sound energy is increased. Thus, the noises may be rather increased. It is also likely that the chain may sometimes include a pin having such a small sectional area as to suffer insufficient strength or rigidity or a pin having such a great sectional area as to lower the degree of freedom of designing the chain 1. However, such disadvantages may be obviated by defining the sectional area of the greater pin to be 1.1 times to twice the sectional area of the thinner pin, as suggested by the embodiment. From this viewpoint, the sectional area of the greater pin 3f may more preferably be 1.5 times to twice the sectional area of the thinner pin 3h.

While the chain of the above embodiment includes two types of pins 3f, 3h having the different sectional areas, the number of pin types is not limited two. As a matter of course, the chain may include three or more types of pins. The different types of pins may have the same sectional area and the difference of the pins may consist only in the sectional shape. In this case, as well, the pulleys 10, 20 may receive different forces in different timings when the pins are subjected to the compressive deformation or restorative deformation based on the aforementioned principles of noise production.

As described above, the two pins compared with respect to the sectional areas or shapes thereof as determined at the respective corresponding positions in the pin longitudinal direction are determined to have the different sectional areas or shapes only if the sections of one pin include at least one different sectional area or shape from any of those of the other pin. Therefore, an arrangement is also possible wherein two pins in comparison have substantially the same sectional shapes or areas as determined at most of the corresponding positions in the pin longitudinal direction, while one of the pins is formed with a notch, recess or protrusion at a place on the pin-longitudinal length thereof, so that a section taken at the place of interest has a different sectional shape or area from any of the sections of the other pin. In this case, as well, the pulleys 10, 20 may receive different forces in different timings when the pins are subjected to the compressive deformation or restorative deformation based on the aforementioned principles of noise production.

According to the embodiment, as described above, the link having the greater pitch is more preferably penetrated by the pin having the greater width in the chain longitudinal direction. The embodiment includes the following modes A and B, for example.

Mode A: Provided that the pin includes two types which include one having a greater width with respect to the chain longitudinal direction (hereinafter, referred to as "greater pin") and one having a smaller width with respect to the above direction (hereinafter, referred to as "thinner pin"), whereas the link includes two types which include Link A wherein one of the two through-holes is penetrated by the greater pin and the other through-hole is penetrated by the thinner pin, and Link B wherein both of the through-holes are penetrated by the thinner pins, Link A has a greater pitch than Link B, and Mode B: Provided that the pin includes two types which include the greater pin and the thinner pin, whereas the link includes three types which include Link C wherein both of the through-holes are penetrated by the greater pins, Link D wherein one of the through-holes is penetrated by the greater pin and the other through-hole is penetrated by the thinner pin, and Link E wherein both of the through-holes are penetrated by the thinner pins, these links have their pitches defined by the following inequality: Link C>Link D>Link E.

As seen from the above mode examples A and B, that the link having the greater pitch is penetrated by the pin having the greater length with respect to the chain longitudinal direction means that the greater the sum of the chain-longitudinal widths of the pins through a single link, the greater the pitch of the link combined with the pins, the width determined at place where the pin intersects the link. This approach facilitates the design of the chain including the plural types of pins.

While the embodiment uses the plural types of pins having the different sectional areas, the chain may also include plural types of pins having different rigidities against a force acting in the pin longitudinal direction. In this case, as described above, the pulleys 10, 20 may receive the different forces in different timings when the pins are subjected to the compressive deformation or restorative deformation based on the aforementioned principles of noise production. The differentiation in rigidity may be accomplished by using any suitable one of the methods, for example, wherein the pins are varied in the sectional area or sectional shape so as to have different rigidities, wherein the pins are formed from different materials, and wherein the metallic pins are heat processed in different ways.

As to the order in which the plural types of pins are arranged to form the power transmission chain of the embodiment, it is preferred to arrange the plural types of pins in random order. This is because such a random pin array is effective to disperse the noise frequencies and to reduce the resonance even further.

The most suitable one of the random pin arrays may be determined as follows, for example. An experiment may be conducted using a plurality of chains, pin arrays of which are randomly varied, or a computer simulation may be performed. Subsequently, the optimum pin array minimizing the noises may be selected.

While the above embodiment uses several types of links, one type of link may be used. In order to use one type of link, all the pins may preferably have the same sectional shape at places where the pins intersect the links. To meet this purpose, a method may be adopted wherein plural types of pins are formed to have the same sectional shape and sectional area but are formed from different materials, or wherein the plural types of pins have mutually different sectional shapes as determined at respective corresponding pin-longitudinal positions thereof except for place where the pins each intersect the links. In the case where one type of link is used, the number of chain components is decreased to facilitate parts management. Furthermore, the chain may be assembled easily, resulting in cost reduction.

Verification of Sound Pressure Level Reducing Effect based on Examples

Figure 3:
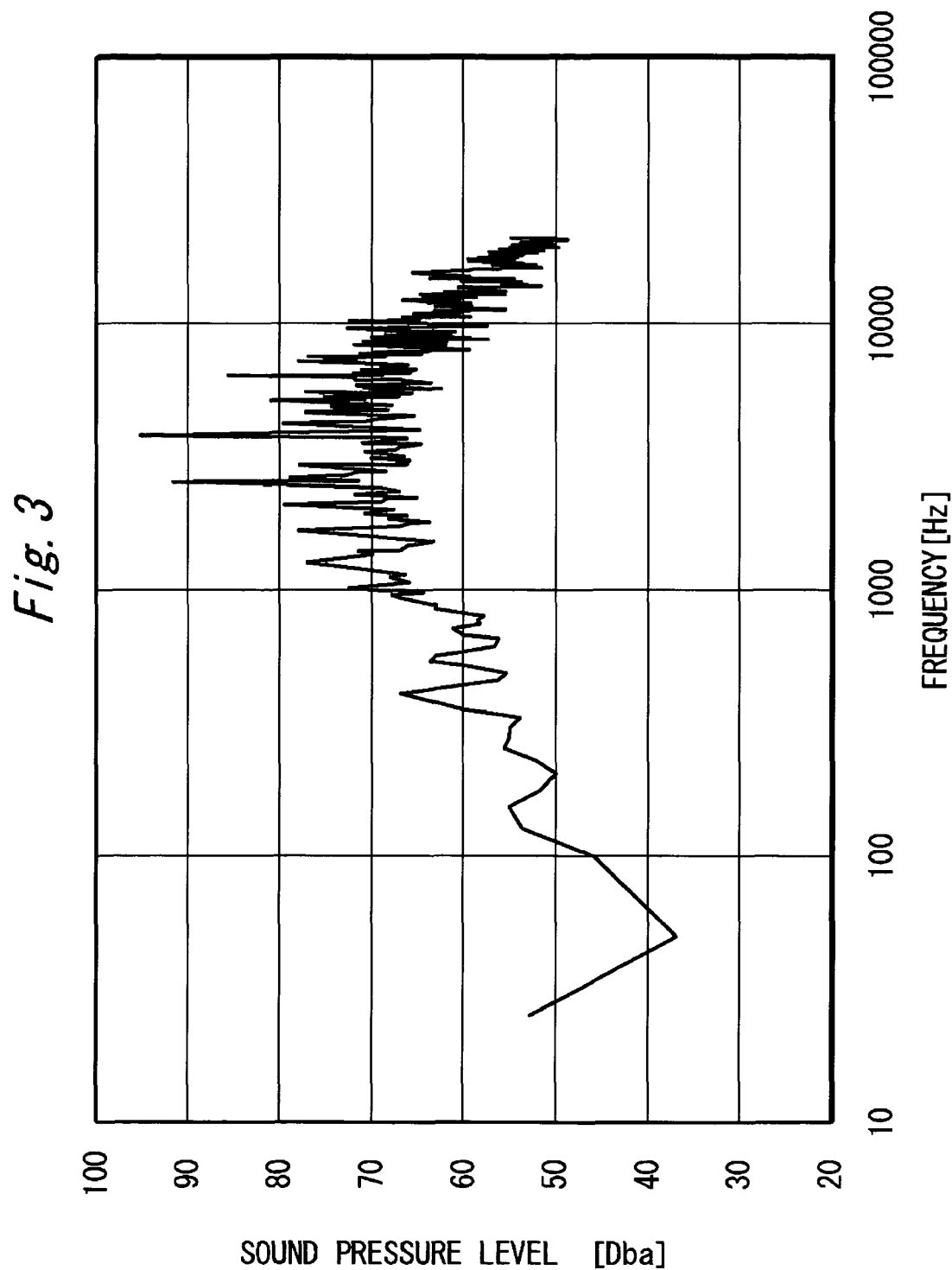
FIG. 3 is a graph showing a sound pressure level at each frequency of noises produced in a power transmission assembly employing a chain according to Comparative Example 1 of the first aspect hereof.
Figure 4:
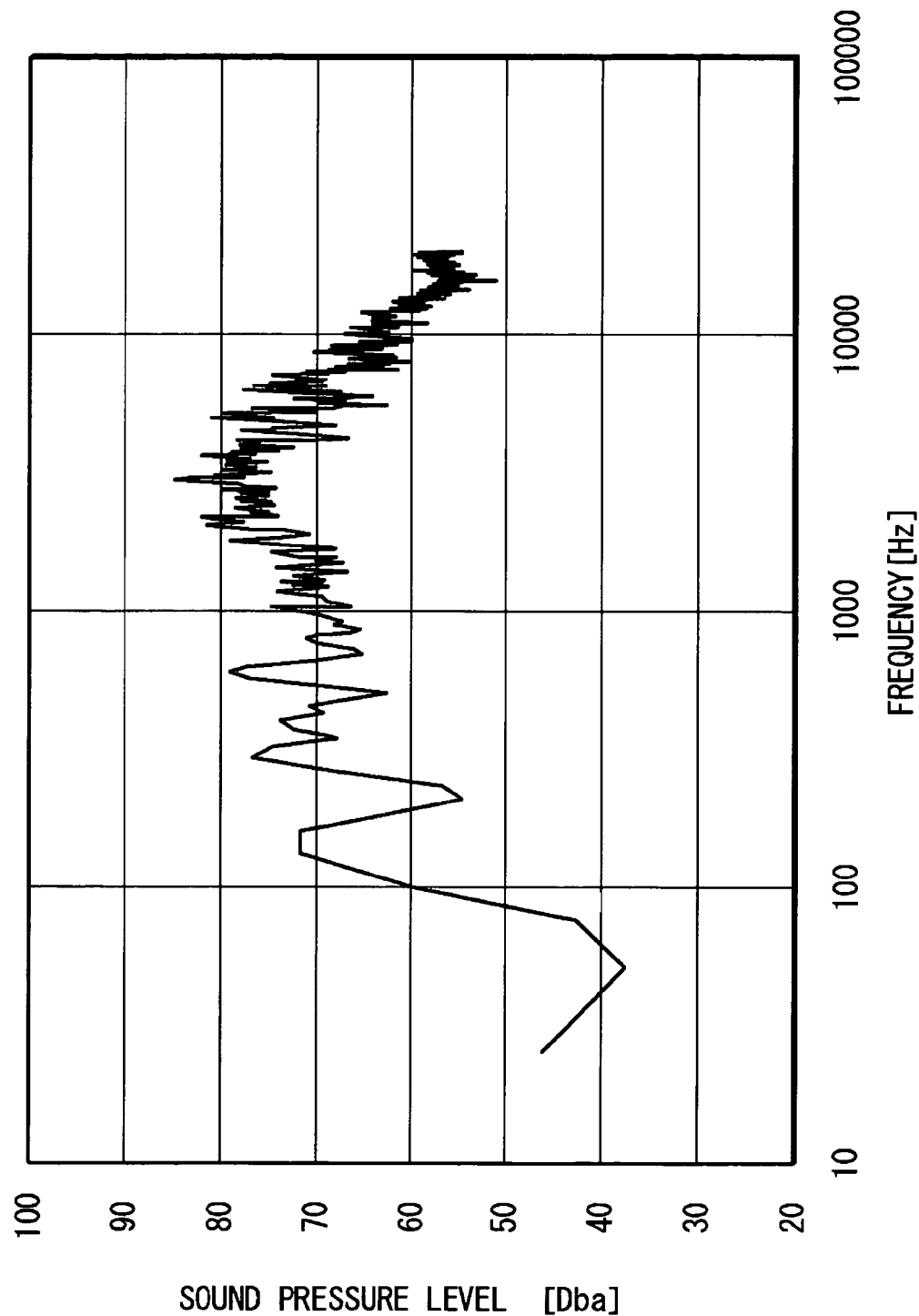
FIG. 4 is a graph showing a sound pressure level at each frequency of noises produced in a power transmission assembly employing a chain according to Example 1 of the first aspect hereof.

A verification test was conducted on an example and comparative examples of the invention to confirm the sound-pressure-level reducing effect of the first aspect of the invention. FIG. 3 is a graph showing a sound pressure level at each frequency of noises measured during the operation of the power transmission assembly equipped with a chain of Comparative Example 1. The chain includes one type of pins substantially having the same pin-longitudinal length, and one type of links. The chain of Comparative Example 1 has a constant pin-to-pin distance (pitch) with respect to the overall length thereof. On the other hand, FIG. 4 is a graph showing measurement results of a power transmission assembly equipped with a chain of Example 1. The pin includes two types of pins substantially having the same pin-longitudinal length but having different chain-longitudinal widths, and two types of links having mutually different pitches. Unlike the above chain of Comparative Example 1 having the equal pitch, the chain of Example 1 is arranged such that the pin-to-pin distance (pitch) is varied. The power transmission assemblies of Example 1 and Comparative Example 1 have the same specifications except for those of the pin and link.

Example 1 uses two types of links having a pitch P1 of 8.8 mm and a pitch P2 of 8.2 mm, and two types of pins which include a greater pin having a chain-longitudinal width Lf of 2.5 mm and a thinner pin having a chain-longitudinal width Lh of 2.0 mm (80% of the width Lf) (see FIG. 2). Both of the pins have a width La of 6 mm with respect to the chain widthwise thickness (see FIG. 2).

As shown in FIG. 3 and FIG. 4, Example 1 reduced a maximum sound pressure value by about 10 dB from that of Comparative Example 1.

Next, an embodiment according to a second aspect of the invention will be described with reference to the accompanying drawings.

An arrangement of an essential part of a chain-type continuously variable transmission 100 (hereinafter, simply referred to as "chain") according to the embodiment of the second aspect is schematically shown in FIG. 1 just as the aforementioned chain 1 of the first aspect. Hence, the chain 100 is basically constructed the same way as the chain 1. That is, this chain 100 is generally shaped like an endless belt and includes: a plurality of metallic links 2; a plurality of metallic pins 3 for interconnecting these links 2; and a plurality of strips 5 slightly shorter than the pins 3 with respect to the pin longitudinal direction. The links 2 and pins 3 are formed from a metal such as a bearing steel. All the plural strips 5 have the same configuration. On the other hand, the plural pins 3 include those having different sectional shapes. However, all the pins 3 have the same longitudinal length. The end face 3t of the pin 3 is located outwardly of the end face of the strip 5 with respect to the chain widthwise direction, so that the end face 3t contacts the sheave surface of the pulley. In this chain 1, the pin 3 serves as a transmission pin also functioning as a chain friction transmission member.

Figure 5:
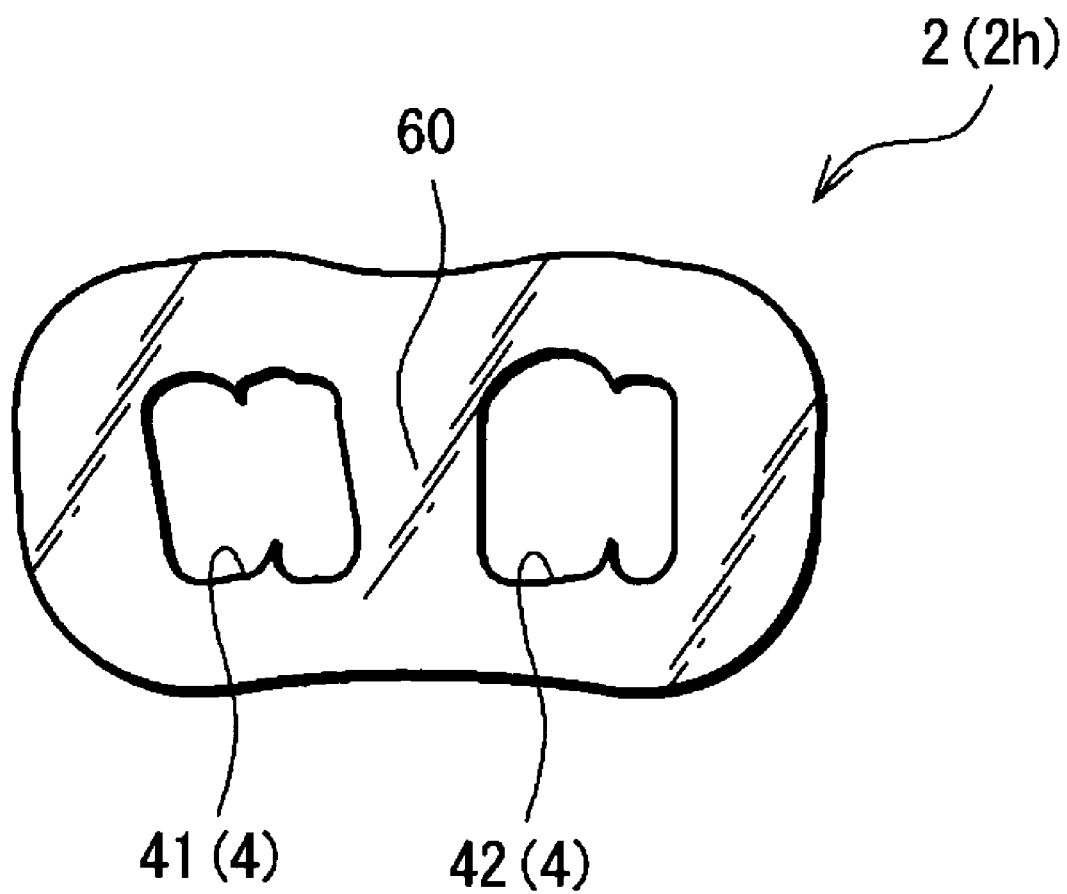
FIG. 5 is a side view of a link used in the chain of FIG. 1.

FIG. 5 is a plan view showing the link 2 of the chain 100 according to the second aspect of the invention. The link 2 is also configured the same way as that of the chain 1 of the first aspect. As shown in FIG. 5 and FIG. 1, the link 2 has an outside shape formed by a substantially rectangular sheet member rounded off at the corners thereof. Furthermore, the link possesses two through-holes 4 juxtaposed to each other along a longitudinal direction thereof (coinciding with the chain longitudinal direction). One through-hole 4 has one strip 5 and one pin 3 inserted therethrough. A plural number of links 2 are arranged in the chain widthwise direction in an overlapping relation, while a plural number of links 2 are arranged as shifted relative to one another along the chain longitudinal direction. A plural number of links 2 are mutually interconnected by inserting one pin 3 through the through-holes 4 of the links arranged in the chain widthwise direction in overlapping relation as shifted relative to one another with respect to the chain longitudinal direction. Thus, the links form the chain 100 in the form of the endless belt.

As shown in FIG. 5, the two through-holes 4 of the link 2 are the first through-hole 41 and the second through-hole 42 arranged in the chain longitudinal direction. The first through-hole 41 and the second through-hole 42 have mutually different configurations such as to permit the chain 1 to bend in the chain longitudinal direction (the chain 1 so bent as to be looped over the circular pulley). In the chain 1, all the links 2 are configured such that the first through-hole 41 is located on one side relative to the second through-hole 42 with respect to the chain longitudinal direction. In other words, all the links 2 are configured such that the second through-hole 42 is located on the other side relative to the first through-hole 41 with respect to the chain longitudinal direction.

FIG. 6 shows the first through-hole 41 and the second through-hole 42 each having a pair of pin 3 and strip 5 inserted therethrough. Each pair of pin 3 and strip 5 penetrate through the first through-hole 41 of one of the plural links 2 and through the second through-hole 42 of another link 2, thereby interconnecting the links 2, arranged in the chain widthwise direction, in a manner to provide bending in the chain longitudinal direction.

As seen in FIG. 6 depicting a single body of link 2, the pin 3 is press-inserted in the first through-hole 41 so as to be fixed therein, whereas the strip 5 in contact with the pin 3 is inserted in the first through-hole 41 via a given gap therebetween so as to be movably fitted in the first through-hole 41. In the second through-hole 42 of the same link 2, on the other hand, the strip 5 is press-inserted in the second through-hole 42 so as to be fixed therein, whereas the pin 3 in contact with the strip 5 is inserted in the second through-hole 42 via a given gap therebetween so as to be movably fitted in the second through-hole 42.

As illustrated by any pair of links 2 shifted relative from each other in the chain longitudinal direction and adjoining each other in the chain widthwise direction, as shown in FIG. 1, the pin 3 is fixed in the first through-hole 41 of one link 2 and is movably fitted in the second through-hole 42 of the other link 2, whereas the strip 5 is movably fitted in the first through-hole 41 of the one link 2 and is fixed in the second through-hole 42 of the other link 2. The pair of pin 3 and strip 5 inserted through the same through-hole 4 (the first through-hole 41 or the second through-hole 42) are brought into relative movement in rolling contact, thereby permitting the chain 1 to bend in the chain longitudinal direction.

A locus of contact position between the pin 3 and the strip 5 is defined by an involute of a circle as seen a side view of the chain 1. FIG. 7 shows how the pin 3 and the strip 5 are displaced as moved in rolling contact (exactly, the rolling contact includes a degree of sliding contact and is also referred to as rolling/sliding contact). In the first through-hole 41, only the strip 5 of the pin-strip pair is moved (rotated) relative to the first through-hole 41. In the second through-hole 42, only the pin 3 of the pin-strip pair is moved (rotated) relative to the second through-hole 42. When bending in the chain longitudinal direction, the chain 1 involves such a movement in rolling contact. However, the pin 3 and the strip 5 are constantly in contact in a region including the overall range of the movement in rolling contact. Hence, transmission loss is minimized to ensure high power transmission efficiency.

In order that the locus of contact position between the pin 3 and the strip 5 is defined by the involute of circle, a contact surface 3a, on which the pin 3 contacts the strip 5, has a sectional shape defined by an involute curve outward from a base circle having a predetermined radius R, whereas a contact surface 5a of the strip 5 is defined by a plane (a sectional shape thereof is defined by a straight line). What is necessary is that the involute curve defines a sectional shape of a portion (hereinafter, referred to as "side face of action") of the contact surface 3a, at which the pin 3 contacts the strip 5.

In order to provide the locus of contact position between the pin 3 and the strip 5 which is defined by the involute of circle, the contact surface 3a of the pin 3 may have the involute shape whereas the contact surface 5a of the strip 5 may have the planar shape, as suggested by the embodiment. Conversely, the contact surface 5a of the strip 5 may have the involute shape whereas the contact surface 3a of the pin 3 may have the planar shape. Alternatively, both of the contact surfaces 3a, 5a may be curved so as to provide the above locus defined by the involute of circle. It is preferred in this case that the contact surface 3a and the contact surface 5a have their side faces of action defined by the same sectional shape.

The term "involute", as used herein, also includes shapes resemblant to involute (sub-involutes). This is because the contact surface having a sub-involute sectional shape is also effective to reduce the polygonal vibrations to some extent.

The chain 1 includes two or more types of pins 3, the contact surfaces 3a (side faces of action) of which have sectional shapes defined by involutes of base circles having different radii. As a result, the pins 3 and the strips 5 are combined to form two or more types of pairs which provide the loci of contact position defined by involutes of base circles having different radii.

The plural pins 3, also serving as the chain friction transmission member, include plural types of pins 3 having mutually different rigidities against force acting in the chain widthwise direction. In this embodiment, the above rigidity is varied by varying the sectional area of the pin 3. While all the pins 3 are formed from the same material, the pins are varied in thickness so as to have different rigidities against the force acting the chain widthwise direction (or the pin longitudinal direction). A side elevation of an unbent portion of the chain 100 is shown in FIG. 2, just as that of the aforementioned chain 1. In short, the chain 100 shares the basic construction with the chain 1. Specifically, the pin 3 includes two types of pins $3f$, $3h$ having mutually different sectional areas. The greater pin $3f$ has a comparatively larger sectional area as determined on section perpendicular to the longitudinal direction thereof, whereas the thinner pin $3h$ has the smaller sectional area. The greater pin $3f$ and the thinner pin $3h$ substantially have the same longitudinal length. That the pins substantially have the same length in the longitudinal direction thereof means that the longitudinal lengths of plural pins to be formed in the same length by a normal method have errors within tolerances. For instance, difference in the longitudinal lengths of the pins is 60 μm or less The greater pin $3f$ and the thinner pin $3h$ are each configured such that the pin has the same sectional shape as determined at any points of the longitudinal length thereof (determined on sections perpendicular to the longitudinal direction thereof and will be hereinafter referred to simply as "sectional shape") and has a constant sectional area as determined at any points of the overall longitudinal length thereof (determined on sections perpendicular to the longitudinal direction thereof and will be hereinafter referred to simply as "sectional area"). That is, each of the pins substantially has the same sectional shape and sectional area as determined at any points of the longitudinal direction thereof.

As shown in FIG. 2, the sectional shape of the greater pin $3f$ is defined by expanding the sectional shape of the thinner pin $3h$ in the chain-ongitudinal direction. When the sectional shapes of the greater pin $3f$ and the thinner pin $3h$ mounted in the chain 100 are compared, these pins substantially have the same width with respect to the chain thickness direction (the vertical direction as seen in FIG. 2). However, the greater pin $3f$ has a greater chain-longitudinal width Lf than a chain-longitudinal width Lh of the thinner pin $3h$.

When he sectional areas of the greater pin $3f$ and the thinner pin $3h$ are compared, the sectional area of the greater pin $3f$ is preferably 1.01 times to twice the sectional area of the thinner pin $3h$, or more preferably 1.1 times to twice the sectional area of the thinner pin.

The through-hole 4 of the link 2 is configured to correspond to the shapes of the greater pin $3f$ and the thinner pin $3h$. Specifically, the greater through-hole $4f$ penetrated by the greater pin $3f$ is greater than the thinner through-hole $4h$ penetrated by the thinner pin $3h$. In order to permit the chain 100 to bend circumferentially, the first through-hole 41 and the second through-hole 42 as the right and left through-holes 4 in one link 2 have mutually different configurations, as described above. When the term, the greater through-hole $4f$ or the thinner through-hole $4h$ is used herein, a difference between the first through-hole 41 and the second through-hole 42 is disregarded and all the through-holes 4 penetrated by the greater pins $3f$ are referred to as the greater through-hole $4f$ whereas all the through-holes 4 penetrated by the thinner pins $3h$ are referred to as the thinner through-hole $4h$. The greater through-hole $4f$ may be the first through-hole 41 or the second through-hole 42. Likewise, the thinner through-hole $4h$ may be the first through-hole 41 or the second through-hole 42.

The chain 100 also employs plural types of links 2. As shown in FIG. 2, the link 2 includes the long link $2f$ possessing the greater through-hole $4f$, and the short link $2h$ free from the greater through-hole $4f$. In the long link $2f$, one of the two through-holes 4 is the greater through-hole $4f$ whereas the remainder is the thinner through-hole $4h$. In the short link $2h$, on the other hand, both of the through-holes 4 are the thinner through-holes $4h$.

The pitch P1 of the long link $2f$ is longer than the pitch P2 of the short link $2h$. In correspondence to these pitches P1, P2, a chain-longitudinal length X of the long link $2f$ is greater than a chain-longitudinal length Y of the short link $2h$. In correspondence to the different pitches of the links $2f$, $2h$, respective pairs of pins 3 inserted through these links also have different pitches.

In a case where the chain 100 includes plural pitches, the longest pitch may preferably be about 1.1 times to 1.3 times as long as the shortest pitch, or more preferably about 1.2 times the shortest pitch, because a sufficient effect of providing the plural pitches may be obtained while the longest pitch is not excessively long. In a case where the chain includes plural types of links 2 having different lengths (chain-longitudinal lengths), it is preferred to limit the number of the longest links to ¼ time or less the number of the shortest links. If this ratio is too high, the chain includes too many long links so that long-pitch portions are increased so much as to increase the noises. However, if this ratio is too low, the effect of providing the links of different lengths is decreased. Therefore, the number of the longest links may preferably be 15% or more of the number of the shortest links.

As described above, the pin 3 includes two or more types of pins 3, the contact surfaces 3a of which have the sectional shapes defined by the involutes of the base circles having different radii. The involute configurations and the thicknesses of the pin 3 may be combined freely. For instance, in a case where involute base circles have radii R1 and R2, which are defined as R1>R2, the sectional shape of the thinner pin $3h$ may be defined by the involute of the base circle having the radius R1 while the base circle for the greater pin $3f$ may have the radius R2. Conversely, the sectional shape of the greater pin $3f$ may be defined by the involute of the base circle having the radius R1 while the base circle for the thinner pin $3h$ may have the radius R2.

FIG. 15 is a perspective view schematically showing the arrangement of the chain-type continuously variable transmission 50 as one embodiment of the power transmission assembly of the invention, the transmission including the chain 100. As described in conjunction with the first aspect of the invention, the chain-type continuously variable transmission 50 may be used, for example, as an automotive transmission. The transmission 50 includes: the metallic drive pulley 10 as the first pulley; the metallic driven pulley 20 as the second pulley; and the endless-belt-like chain 100 entrained between these pulleys 10, 20. The pulleys 10, 20 are formed from a metal such as a bearing steel. In FIG. 15, the chain is depicted partly in section for clarity sake.

FIG. 16 is a sectional view showing the pulley 10 or 20 of the continuously variable transmission 50 (the section taken along a diametrical direction of the pulley 10, 20). As shown in the figure, the end faces 3t of the pin 3 of the chain 100 contact the conical sheave surfaces 12a, 13a (22a, 23a) of the pulley 10 (20), which define the inside surfaces of the pulley as opposing each other. Thus, the chain transmits traction produced from contact friction force associated with the contact between the end faces of the pin and the sheave surfaces. Thus, the pin 3 serves as the transmission pin also functioning as the chain friction transmission member.

In the chain 100, the thinner pins 3h and the greater pins 3f are arranged in random order. The short links 2h and the long links 2f are also arranged in random order and hence, the pitches P1 and the Pitches P2 are also arranged in random order. Provided that the involute base circles have different radii, R1 and R2 which are defined as R1>R2, the pin 3 the sectional shape of which is defined by the involute of the base circle having the radius R1 and the pin 3 the sectional shape of which is defined by the involute of the base circle having the radius R2 are arranged in random order. The chain 100 need not consistently include the random-order arrangement for the overall length thereof.

The chain 100 having the above arrangement offers the following working effects.

Since the locus of contact position between the pin 3 and the strip 5 is defined by the involute of circle, the polygonal vibrations are reduced.

Figure 8:
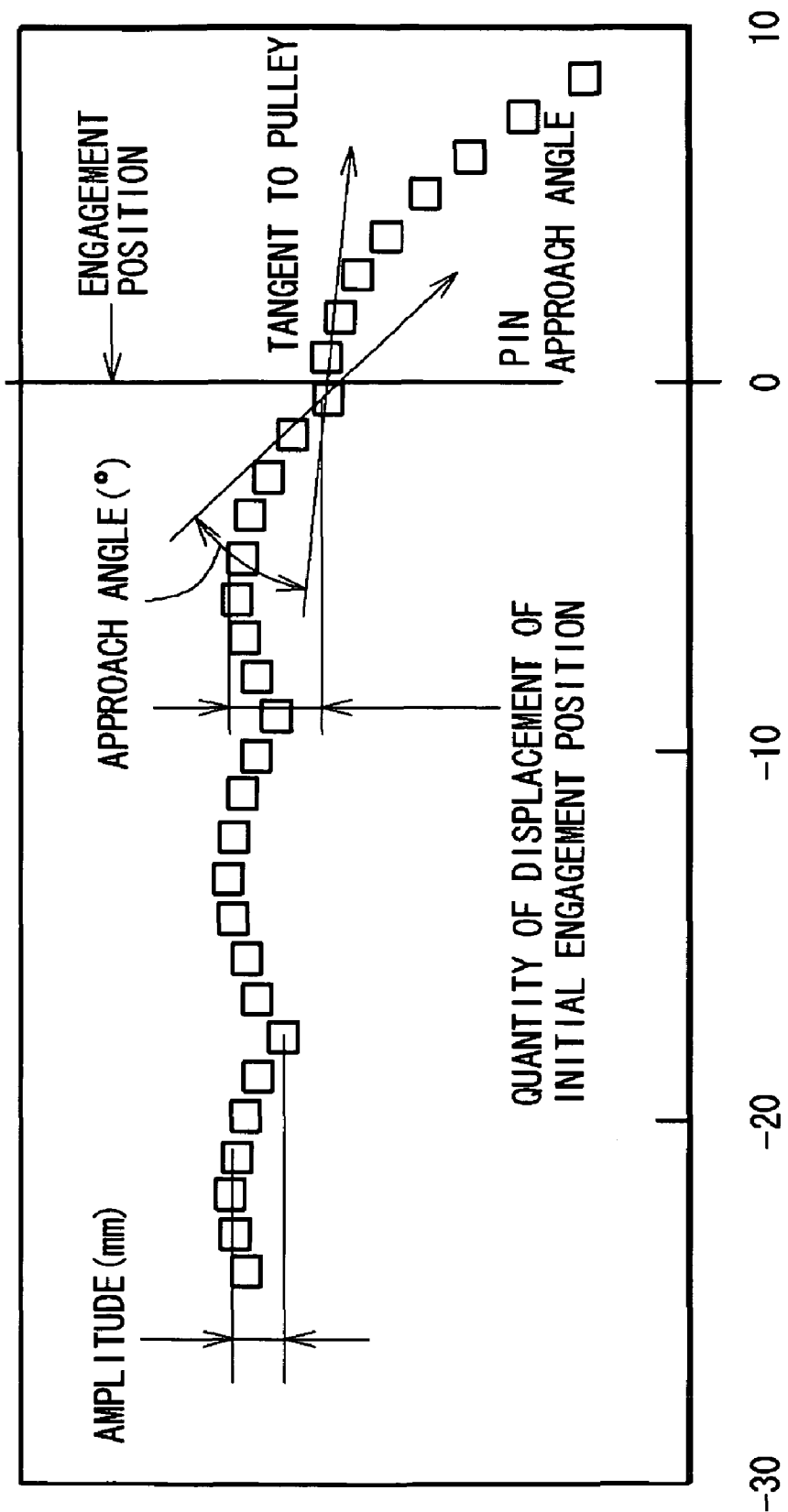
FIG. 8 is a diagram showing a locus of the pin when a conventional common power transmission chain is looped over a pulley.

In this respect, the polygonal vibrations are first described. FIG. 8 schematically shows a locus of the pin when a conventional common power transmission chain is looped over a pulley, as viewed in side elevation of the chain. The figure shows the locus of the pin when the chain, as moved from the right-hand side to the left-hand side as seen in the figure, is looped over the pulley (not shown) located on the right-hand side of the figure. The abscissa of the figure is the distance (mm) from an engagement position where the chain comes into engagement with the pulley. On a downstream side from the engagement position with respect to the chain movement direction (the right-hand side as seen in the figure), the chain is looped over the pulley and hence, the pin locus defines an arc of a radius corresponding to that of the loop of the chain 100. On an upstream side from the engagement position with respect to the chain movement direction (the left-hand side as seen in the figure), the pin locus fluctuates up and down in a wave-like fashion. The fluctuations represent the polygonal vibrations. Such polygonal vibrations occur because the chain is formed by interconnecting the links so that the chain, as bent in the chain longitudinal direction, defines a polygonal shape rather than a true arc. In this case, a tangent to the pulley at the engagement position is directed differently from a pin approach direction so that an approach angle as shown in FIG. 8 is formed. Thus, the pin comes into contact with the pulley as moved downwardly. A quantity of downward movement of the pin at the moment of contact with the pulley is indicated as a quantity of displacement of initial engagement position. The downward movement of the pin causes a vertical fluctuating motion of the chain, which is repeated to produce the polygonal vibrations. If the aforementioned locus of the contact position is defined by the involute of circle, the above approach angle (see FIG. 8) is decreased so that the quantity of displacement of initial engagement position is decreased. As a result, the polygonal vibrations are reduced.

Since the pins 3 and the strips 5 form two or more types of pairs providing the involutes of base circles having different radii, the resonance of the polygonal vibrations are suppressed so that the noises resulting from the polygonal vibrations are reduced.

Furthermore, the greater pin 3f and the thinner pin 3h have different sectional areas, so that the noises during the operation of the chain-type continuously variable transmission 50 may be reduced. The principles are as follows.

In the chain-type continuously variable transmission 50 shown in FIG. 15, when the chain 100 approaches the sheave surfaces 12a, 13a, 22a, 23a of the pulleys 10, 20, the pins 3 of the chain 100 collide with these sheave surfaces to press the sheave surfaces. In reaction, the end faces 3t of the pins 3 are pressed by the sheave surfaces, so that the pins 3 are deformed under force compressing the pins in the longitudinal direction thereof (the deformation will be hereinafter referred to as "compressive deformation"). The pins 3 are elastically deformed by this force and thereafter, are so deformed as to restore to their original shapes (this deformation will be hereinafter referred to as "restorative deformation"). During the restorative deformation, the pins press the sheave surfaces 12a, 13a, 22a, 23a again. Based on such principles (hereinafter, also referred to as "principles of noise production"), the pulleys 10, 20 are brought into vibrations, which produce the noises.

The chain 100 of the embodiment includes a few types of pins 3 having different areas of the sections perpendicular to the longitudinal direction thereof, namely, the greater pin 3f and the thinner pin 3h. In the aforementioned principles of noise production, the greater pin 3f and the thinner pin 3h differ in the magnitude of pressing force on the sheave surface or time to press the sheave surface. Particularly, the greater pin 3f and the thinner pin 3h differ in the mode of the aforesaid restorative deformation. Hence, the greater pin and the thinner pin in the restorative deformation apply the different pressing forces to the individual sheave surfaces or apply the pressing forces in different timings. Accordingly, the frequencies of the noises from the pulleys 10, 20 are dispersed so that a peak value of sound pressure level of the noises may be lowered. In addition, the resonance between the pulleys 10, 20 may also be suppressed. Consequently, the chain-type continuously variable transmission 50 may be reduced in the noises during operation.

The greater pin 3f and the thinner pin 3h each have the same sectional shape and the same sectional area as determined at any points of the longitudinal direction thereof. That is, each of the pins is designed to have the same sectional shape and the same sectional area at any points of the longitudinal direction thereof. Since the individual pins have relatively simple configurations, the pins are easy to manufacture.

Since the greater pin 3f and the thinner pin 3h substantially have the same length in the longitudinal direction thereof, wear concentration on a certain pin 3 may be obviated.

When the sectional shapes of the greater pin 3f and the thinner pin 3h mounted in the chain 1 are compared, these pins substantially have the same length with respect to the chain thickness direction (the vertical direction as seen in FIG. 2). However, the greater pin 3f has a greater chain-longitudinal width Lf than a chain-longitudinal width Lh the thinner pin 3h.

The link 2 is designed to have the pitch corresponding to the sectional shape of each pin 3f or 3h. Specifically, the link 2 penetrated by the greater pin 3f is formed with the greater through-hole 4f, as the larger through-hole 4, in correspondence to the greater pin 3f. This link is the long link 2f having the greater pitch in correspondence to the greater through-hole 4f.

In this embodiment, the links also have different chain-longitudinal lengths in correspondence to the different pitches.

As described above, the plural types of links 2 having the different pitches are used, while the link having the greater pitch is penetrated by the pin having the greater chain-longitudinal width. This facilitates the design of the chain 100. In the case where the plural types of pins are used to reduce the noises, as described above, the plural types of pins 3 are previously manufactured merely by varying the chain-longitudinal width of the pin section. Then, the individual links are varied in the pitch in correspondence to the respective pins. This makes it easy to design the chain 100 having different pitches and different chain-longitudinal widths of the pin section 3. Furthermore, the longitudinal length of the chain itself is varied in correspondence to the difference in the pitch and chain-longitudinal width of the pin. Thus, the design of the chain 100 is facilitated as compared with a case where, for example, the vertical width of the pin section (with respect to the chain thickness direction) is varied.

The long link 2f and the short link 2h have different pitches so that the chain-longitudinal pitch between the pins 3 also differs accordingly. Because of the different chain-longitudinal pitch between the pins 3, the pins 3 also contact the pulley at different pitches. Hence, the frequencies of noises produced by the contact between the pin 3 and the pulley are dispersed, so that the peak of sound pressure level of the noises is lowered. Since the belt has the arrangement wherein the link having the greater pitch is penetrated by the pin 3 having the greater chain-longitudinal width, it is easy to vary the pitch of the pins 3 and the rigidity of the pin 3 against the force in the chain widthwise direction. Thus, the noise reduction effect is further enhanced.

When the sectional areas of the greater pin 3f and the thinner pin 3h are compared, the sectional area of the greater pin 3f may preferably be 1.01 times to twice the sectional area of the thinner pin 3h. If this factor is less than 1.01, the difference in the sectional areas of the plural types of pins is so small that the aforesaid noise reduction effect may become insufficient. If this factor is more than two, the pin-to-pin distance (pitch) in the chain longitudinal direction tends to be increased so much that the sound energy is increased. Thus, the noises may be rather increased. It is also likely that the chain may sometimes include a pin having such a small sectional area as to suffer insufficient strength or rigidity or a pin having such a great sectional area as to lower the degree of freedom of designing the chain 1. However, such disadvantages may be obviated by defining the sectional area of the greater pin to be 1.01 times to twice the sectional area of the thinner pin, as suggested by the embodiment. From this viewpoint, the sectional area of the greater pin 3f may more preferably be 1.5 times to twice the sectional area of the thinner pin 3h.

While the above embodiment is explained by way of example of the two involute base circles having different radii, three or more involute base circles having different radii may be used. Likewise, the rigidities or pitches of the pins are not limited two different values, as illustrated by the embodiment. As a matter of course, the pins may have three or more different values of rigidities or pitches. However, if each parameter has too many different values, costs of parts management and manufacture costs are increased. It is favorable to use a few different values for each of the pin rigidity, pitch, radius of the involute base circle because an adequate noise reduction effect may be obtained and may also be well balanced with the costs.

The rigidity of the pin (rigidity against the force acting in the chain widthwise direction) may be varied by using pins having the same sectional area but mutually differing only in the sectional shape, or by using pins having the same sectional area and sectional shape but formed from different materials. Instead of using different materials, the pins may be formed from the same material but heat treated in different ways. In another mode of varying the rigidity, for example, a pair of pins in comparison may be so formed as to have the same sectional shapes and areas as determined at most of the corresponding positions in the pin longitudinal direction, while one of the pins may be formed with a notch, recess or protrusion at a place on the pin-longitudinal length thereof, so that a section taken at the place of interest has a different sectional shape or area from any of the sections of the other pin.

The rigidity of the pin (rigidity against the force acting in the chain widthwise direction) may also be varied as follows. The pin 3 may be formed with a recess such as a groove on its back surface 3d (see FIG. 6) opposite from the contact surface 3a thereof, whereby the sectional area of the pin 3 may be varied. In this case, a plurality of identical pins 3 may be previously prepared, while the pins may be varied in the sectional area and sectional shape by forming the recess such as a groove on the back surface 3d or omitting the recess, varying the recess configuration or location of the recess. This approach has the following advantages. That is, the rigidity variations may be attained merely by performing a simple process (groove forming process). Furthermore, the grooves provide easy identification of the pin types 3. What is more, the formation of the recess does not affect the sectional shape of the contact surface 3a or the configuration of the through-hole 4.

According to the invention, as described above, the link having the greater pitch is preferably penetrated by the pin having the greater width in the chain ongitudinal direction. The invention includes the following modes A and B, for example.

Mode A: Provided that the pin includes two types which include one having a greater width in the chain ongitudinal direction (hereinafter, referred to as "greater pin") and one having a smaller width in the above direction (hereinafter, referred to as "thinner pin"), whereas the link includes two types which include Link A wherein one of the two through-holes is penetrated by the greater pin and the other through-hole is penetrated by the thinner pin, and Link B wherein both of the through-holes are penetrated by the thinner pins, Link A has a greater pitch than Link B, and Mode B: Provided that the pin includes two types which include the greater pin and the thinner pin, whereas the link includes three types which include Link C wherein both of the through-holes are penetrated by the greater pins, Link D wherein one of the through-holes is penetrated by the greater pin and the other through-hole is penetrated by the thinner pin, and Link E wherein both of the through-holes are penetrated by the thinner pins, these links have their pitches defined by the following inequality:

$$\text{Link } C > \text{Link } D > \text{Link } E.\ *$$

As seen from the above mode examples A and B, that the link having the greater pitch is penetrated by the pin having the greater width with respect to the chain longitudinal direction means that the greater the sum of the chain-longitudinal widths of the pins through a single link, the greater the pitch of the link combined with the pins, the width determined at place where the pin intersects the link. This approach facilitates the design of the chain including the plural types of pins.

As mentioned supra, it is preferred that the plural pin rigidities, pitches and involute configurations are arranged in random order. The most suitable one of the random sequences may be determined as follows, for example. An experiment may be conducted using a plurality of chains, sequence patterns of which are randomly varied, or a computer simulation may be performed. Subsequently, the optimum sequence minimizing the noises may be selected.

Figure 9:
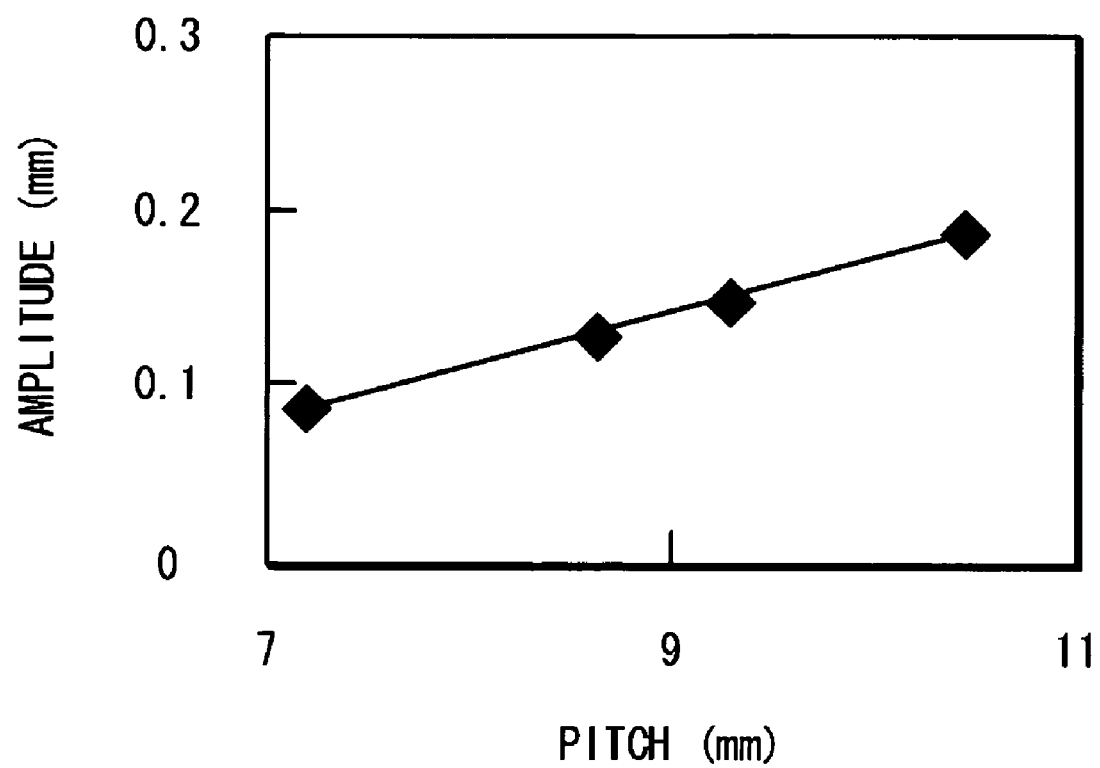
FIG. 9 is a graph showing a relation between the pitch and the amplitude of the conventional common power transmission chain.
Figure 10:
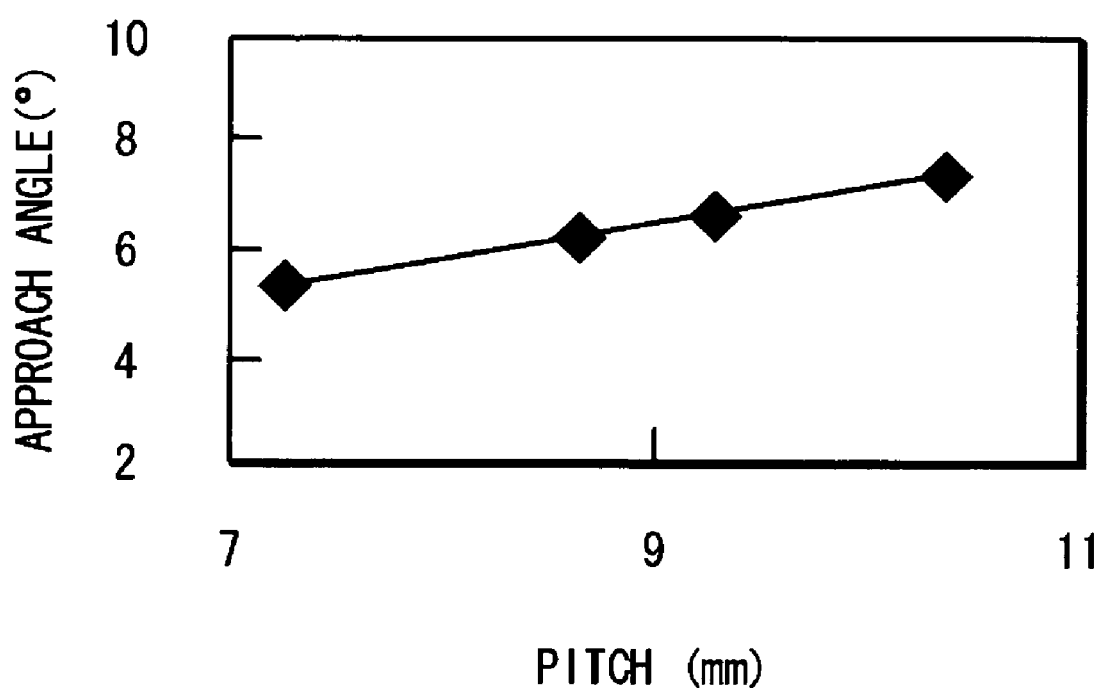
FIG. 10 is a graph showing a relation between the pitch and the approach angle of the conventional common power transmission chain.
Figure 11:
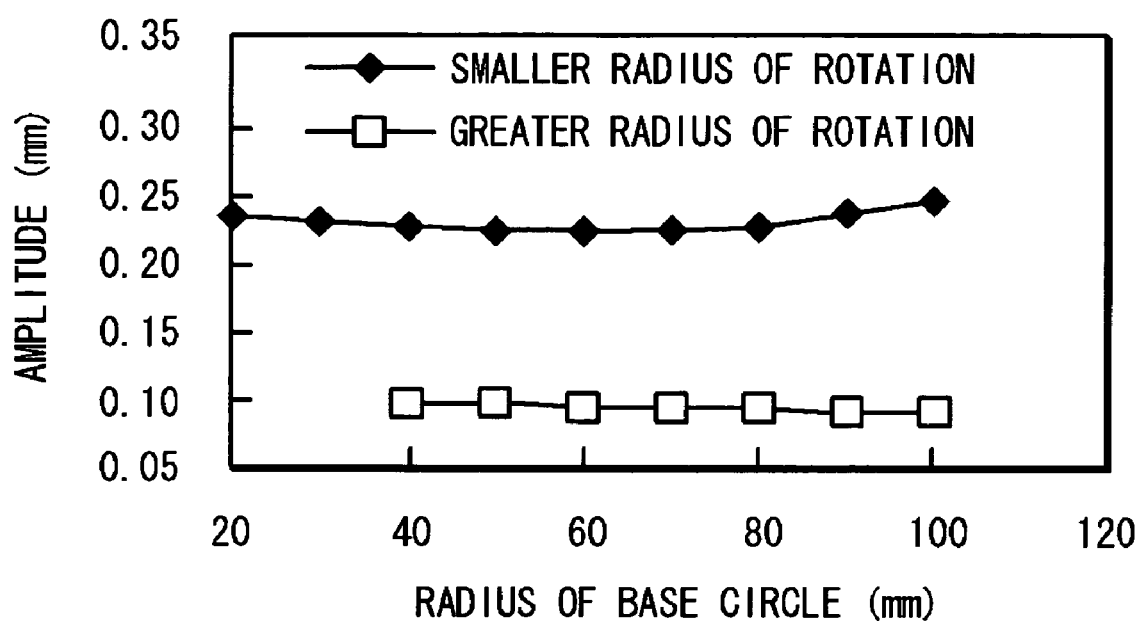
FIG. 11 is a graph showing a general relation between the radius of involute base circle and the amplitude.
Figure 12:
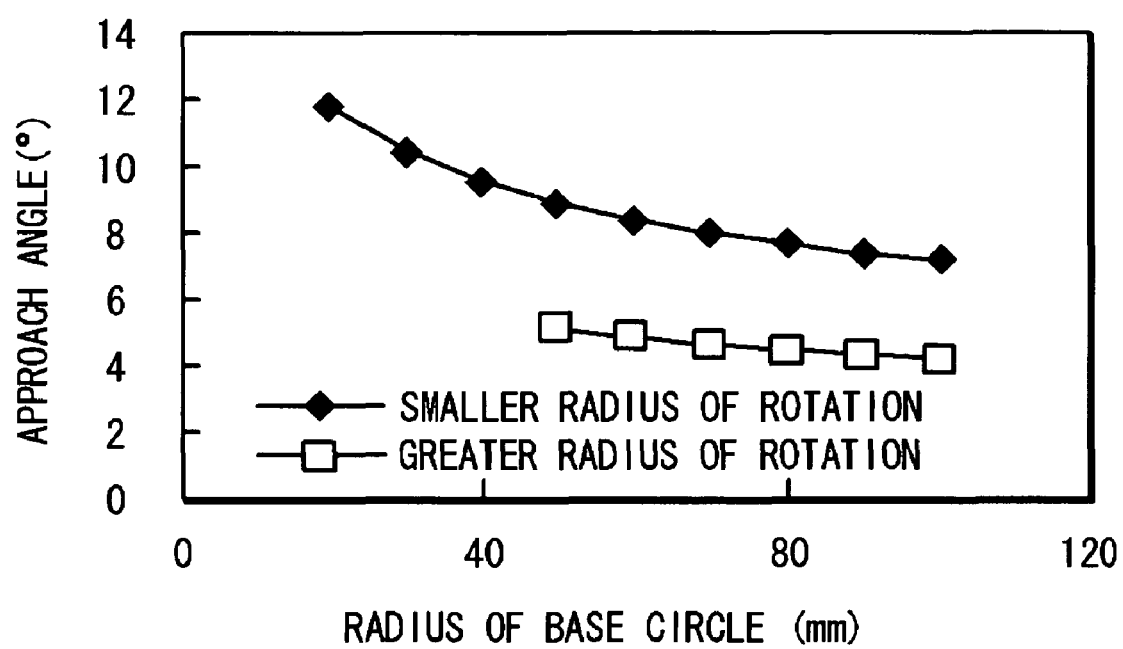
FIG. 12 is a graph showing a general relation between the radius of involute base circle and the approach angle.

In general, the amplitude of the polygonal vibrations and the pitch have a relation that with the increase of the pitch, the amplitude is correspondingly increased (see FIG. 9). Likewise, the approach angle and the pitch have a relation, as shown in FIG. 10, that with the increase of the pitch, the approach angle is correspondingly increased. As shown in FIG. 11, the amplitude of the polygonal vibrations is not increased so much if the involute base circle is increased in the radius. On the other hand, as shown in FIG. 12, as the involute base circle is increased in the radius, the approach angle is correspondingly decreased. Therefore, it is more preferred to increase the radius of the involute base circle in a pair of pin 3 and strip 5 which form the longer pitch, because the demerit associated with the longer pitch is eliminated while the radius of the involute base circle and the pitch may each take plural different values.

In the graphs of FIG. 11 and FIG. 12, the term "smaller radius of rotation" indicates a case where a radius of the chain loop is 31.65 mm, whereas the term "greater radius of rotation" indicates a case where a radius of the chain loop is 73.859 mm.

It is also preferred that the pin providing the involute base circle of the smaller radius is correspondingly decreased in the rigidity. The pin providing the base circle of the smaller radius tends to produce the larger noises (rattles). However, the large noises (rattles) may be absorbed (reduced) by comparatively reducing the rigidity of the pin providing the base circle having the comparatively small radius.

Figure 14:
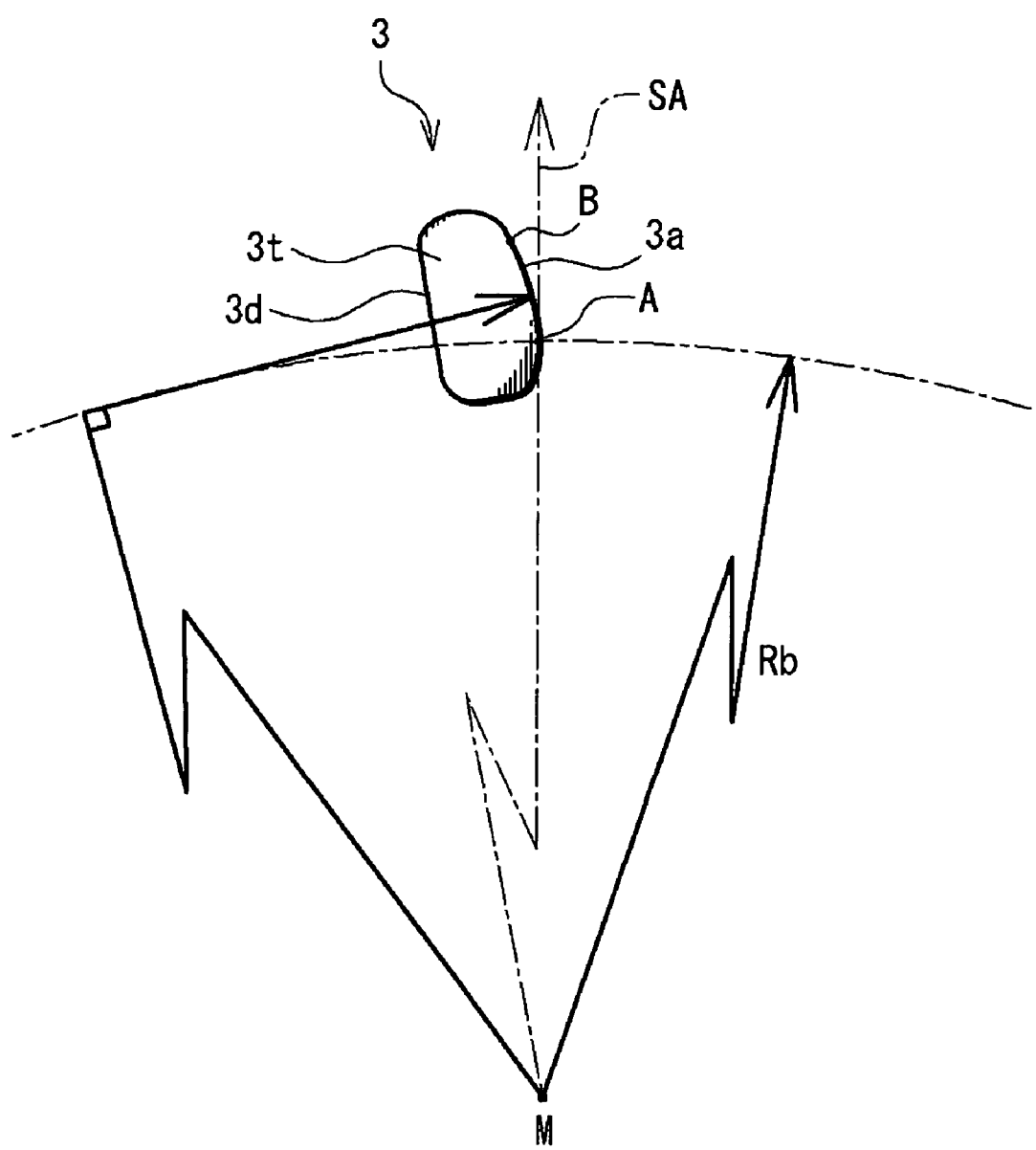
FIG. 14 is a diagram for explaining a preferred involute configuration.

Now, description is made on a preferred mode of the sectional shape of the contact surface 3a of the pin 3 of the chain 100 of the above embodiment. FIG. 14 is a side elevation of the pin 3 as viewed from its end-face 3 side, for explaining the preferred configuration of the contact surface. In the contact surface 3a of the pin 3, the side face of action where the pin is in rolling contact with the strip 5 is a region extending from a contact line A (indicated by a dot in FIG. 14, and hereinafter referred to as "Point A") between the pin 3 and the strip 5 to a contact line B therebetween (indicated by a dot in FIG. 14), the contact lines determined in a state where the chain 100 is not bent. A sectional line of the contact surface 3a is constituted by a gently convexed curve including a sectional line of the side face of action.

As shown in FIG. 14, an involute curve of the side face of action in the section of the pin 3 is preferably defined such that a center M of a base circle of a radius Rb is located on a tangent SA to Point A on the sectional line of the pin 3. The radius Rb of the base circle may preferably be defined to be substantially equal to a distance dA (not shown) between a center (not shown in FIG. 14) of the loop of the chain 100 looped over the pulley (not shown in FIG. 14) and Point A, because the polygonal vibrations are minimized. In the case of an automotive CVT, however, the radius of the chain loop varies in a predetermined range and hence, the above distance dA also varies. In this case, therefore, the radius Rb of the base circle may preferably be defined to satisfy $\frac{1}{4}(dAn) \leq Rb \leq 2(dAx)$, where dAx denotes a value of the dA when the radius of the chain loop is at maximum, and dAn denotes a value of the dA when the radius of the chain loop is at minimum. Plural values of the radius Rb of the base circle may preferably be set within the above range.

Verification of Sound Pressure Level Reducing Effect Based on Examples

Figure 13:
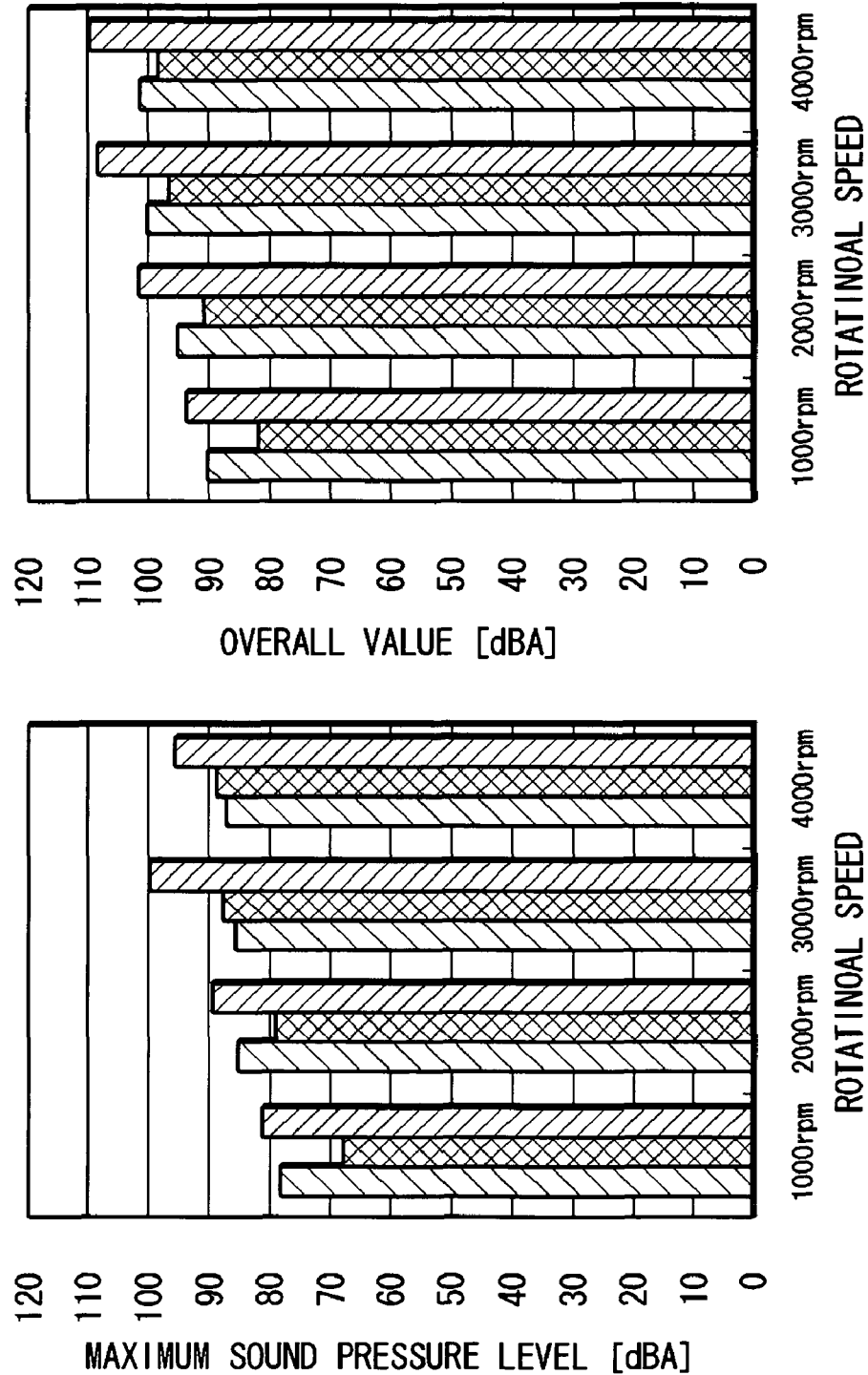
FIG. 13 is a group of graphs for comparing noises in power transmission assemblies according to an example and comparative examples of the second aspect of the invention.

A verification test was conducted on an example and comparative examples of the invention to confirm the sound-pressure-level reducing effect according to the second aspect of the invention. FIG. 13 is a group of graphs for comparing the noises in power transmission assemblies of Example 2 and Comparative Examples 2 and 3, the noises measured under the same conditions when the power transmission assemblies are in operation. Example 2 is constituted the same way as the aforementioned second embodiment of the invention. Example 2 uses two different values of the radius of the involute base circle, the sectional area of the pin 3 and the pitch. These values are combined randomly and the individual value sets are arranged in random order. In Comparative Example 3, a sectional shape of the pin 3 is defined by a convexed curve (crowning) but not by an involute. Comparative Example 3 uses only one value of the pin rigidity and the pitch, respectively. Comparative Example 2 employs a metallic belt conventionally put to practical use in the automotive CVT. The belt has a structure wherein a plurality of thin inter-pieces disposed perpendicularly to a belt longitudinal direction and overlapped with one another in a belt longitudinal direction are interconnected by means of a steel band. It is generally known that the belt of Comparative Example 2 offers a lower degree of freedom of speed change ratio as compared with the conventional power transmission chain such as of Comparative Example 3, because the belt of Comparative Example 2 has lower bendability than that of the conventional power transmission chain. However, the belt produces lower noises than the conventional power transmission chain.

The power transmission assemblies of these three examples were each operated at four rotational speeds, while measurement was taken on the noises. The noises were compared with respect to the maximum sound pressure level (dBA) and the overall value (dBA). In a comparison based on the maximum sound pressure level (dBA), as shown in FIG. 13, the assembly of Example 2 produced lower noises at the all of the four rotational speeds as compared with the assembly of Comparative Example 3. At the rotational speeds of 1000 rpm and 2000 rpm, in particular, the assembly of Example 2 achieved lower values than the assemblies of Comparative Examples 2 and 3. The chain of Example 2 achieved higher noise reduction effect than the metallic belt of Comparative Example 2, which is considered to have comparatively higher silence characteristic. In a comparison based on the overall value (dBA), the assembly of Example 2 produced lower noises at the all rotational speeds as compared with the assemblies of Comparative Example 2 and 3.

While the above embodiment illustrates only the case where the pin 3 also serves as the chain friction transmission member, the chain friction transmission member may be provided separately from the first pin and the second pin in rolling contact with each other. For instance, an arrangement may be made as follows. A bar-like member extended in the chain widthwise direction and in parallel with the first pin and the second pin may constitute the chain friction transmission member (friction block) projecting from these pins in the opposite chain widthwise directions. A plurality of chain friction transmission members may be disposed along the chain longitudinal direction at predetermined space intervals, so that opposite end faces of each of the chain friction transmission members may contact the sheave surfaces of the pulleys for power transmission.

Now, description is made on a mechanism in which the above continuously variable transmission 50 employing the aforesaid chain according to the first and second aspects of the invention functions as the transmission. The drive pulley 10 shown in FIG. 15 is unitarily rotatably mounted to an input shaft 11 connected to an engine. The drive pulley includes: a fixed sheave 12 possessing the conical sheave surface 12a; and a movable sheave 13 possessing the conical sheave surface 13a disposed in opposing relation with the sheave surface 12a. These sheave surfaces 12a, 13a are adapted to clamp the chain 1 (chain 100) on lateral sides thereof with high pressure. On the other hand, the movable sheave 13 is connected with a hydraulic actuator (not shown), which moves the movable sheave 13 in an axial direction of the input shaft 11. When the movable sheave 13 is moved, a distance (groove width) between the opposing sheave surfaces 12a, 13a is varied. Since the width of the chain 1 (chain 100) is constant at all times, the chain 1 (chain 100) engages the sheave surfaces at a radial position commensurate with the width of the chain, so that the radius of the loop of the chain 1 (chain 100) is varied.

In the drive pulley 20, as well, the same principles as those of the drive pulley 10 work so that the radius of the loop of the chain 1 (chain 100) is varied.

The driven pulley 20 is unitarily rotatably mounted to an output shaft 21 connected to drive wheels. The driven pulley includes: a fixed sheave 22 possessing the conical sheave surface 22a; and a movable sheave 23 possessing the conical sheave surface 23a disposed in opposing relation with the sheave surface 22a. These sheave surfaces 22a, 23a are adapted to clamp the chain 1 (chain 100) on the lateral sides thereof with high pressure. On the other hand, the movable sheave 23 is connected with a hydraulic actuator (not shown), which moves the movable sheave 23 in an axial direction of the output shaft 21. When the movable sheave 23 is moved, a distance (groove width) between the opposing sheave surfaces 22a, 23a is varied. Since the width of the chain 1 (chain 100) is constant at all times, the chain 1 (chain 100) engages the sheave surfaces at a radial position commensurate with the width of the chain, so that the radius of the loop of the chain 1 (chain 100) is varied.

When the transmission is shifted to lower gear, the groove width of the drive pulley 10 is increased by moving the movable sheave 13, thereby decreasing the radius of the loop of the chain 1 (chain 100) over the drive pulley 10, while the groove width of the driven pulley 20 is decreased by moving the movable sheave 23, thereby increasing the radius of the loop of the chain 1 (chain 100) over the driven pulley 20.

Conversely when the transmission is shifted to higher gear, the groove width of the drive pulley 10 is decreased by moving the movable sheave 13, thereby increasing the radius of the loop of the chain 1 (chain 100) over the drive pulley 10, while the groove width of the driven pulley 20 is increased by moving the movable sheave 23, thereby reducing the radius of the loop of the chain 1 (chain 100) over the driven pulley 20. The continuously variable transmission function is provided in this manner.

As applied to the power transmission assembly of the chain-type continuously variable transmission 50, the chain of the invention is capable of lowering the sound pressure level of the noises produced during operation.

Figure 17:
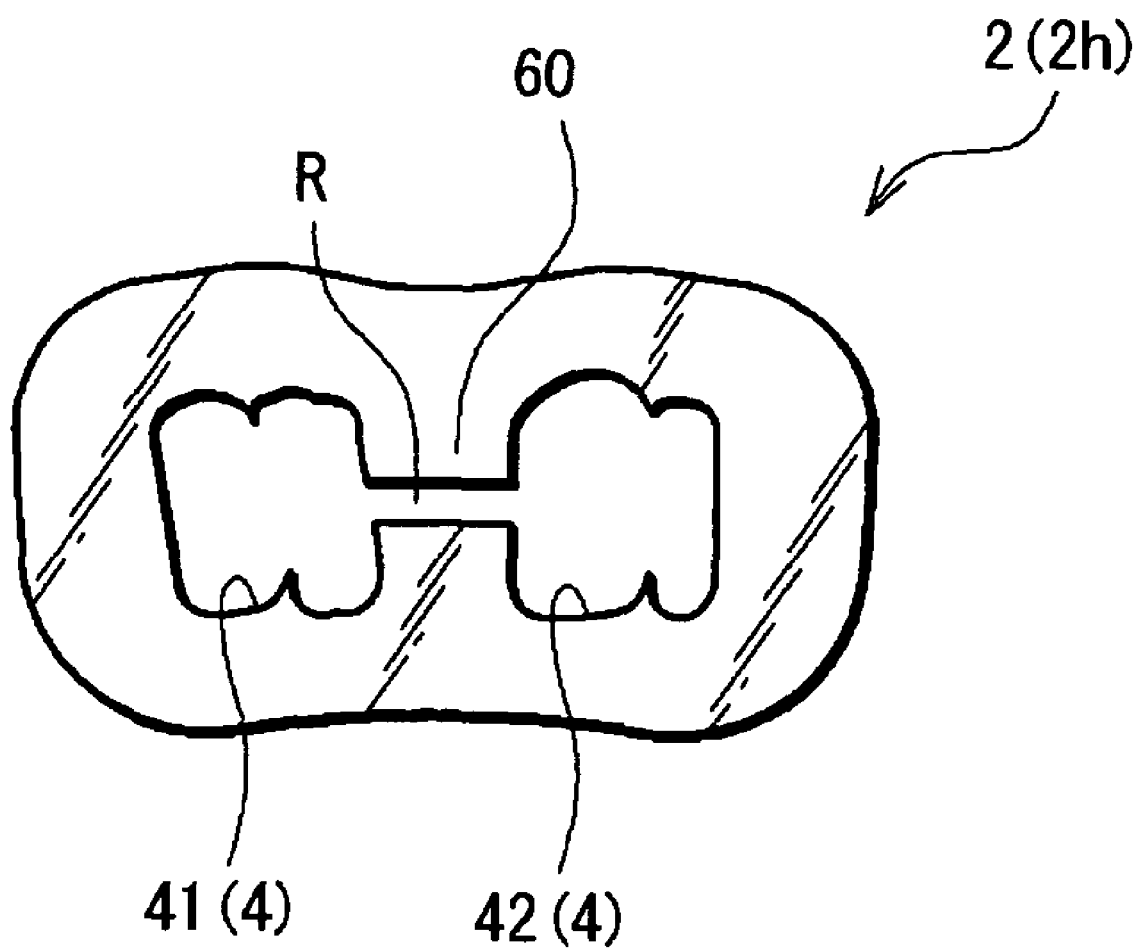
FIG. 17 is a diagram showing a link according to one embodiment hereof, wherein a first through-hole and a second through-hole are communicated with each other.
Figure 18:
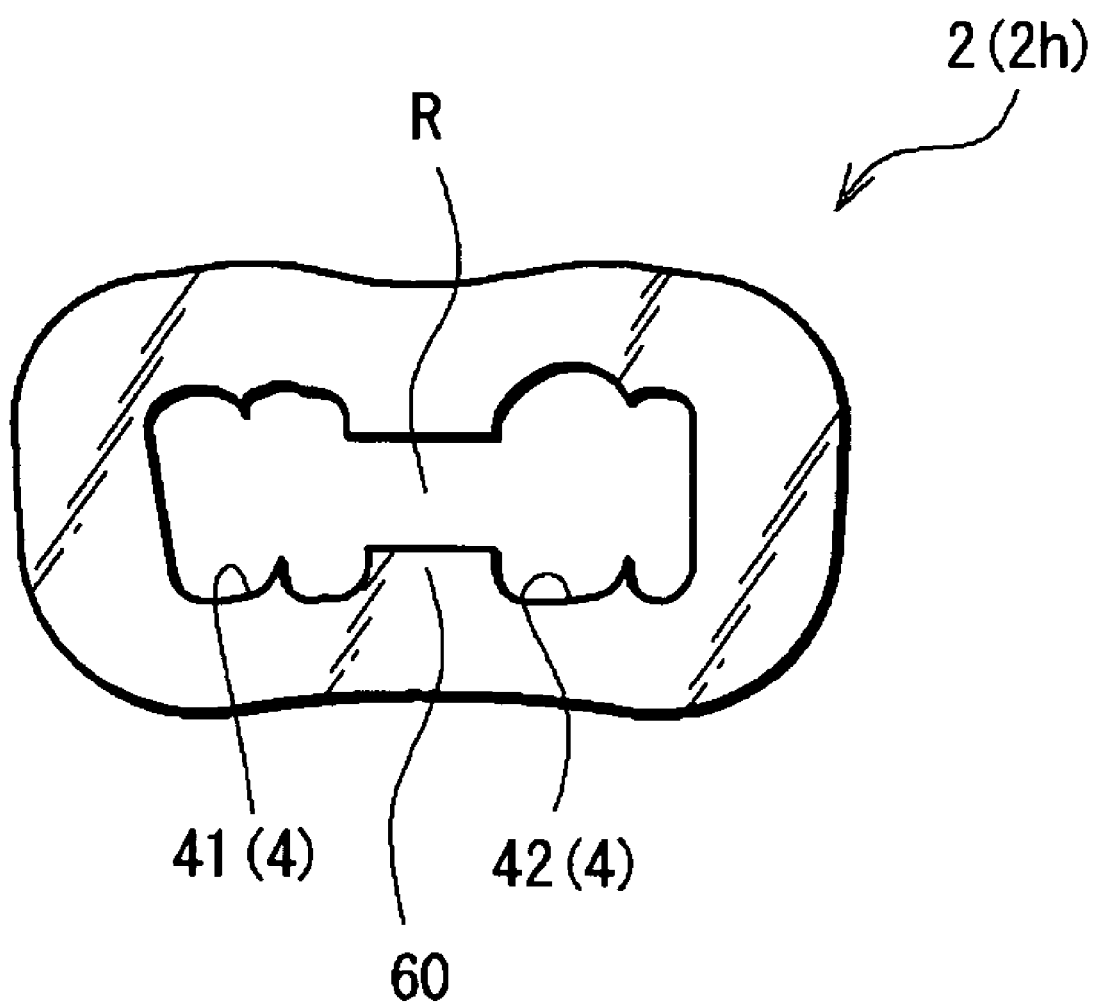
FIG. 18 is a diagram showing a link according to another embodiment hereof, wherein the first-hole and a second through-hole are communicated with each other.

According to the foregoing embodiments of the first and second aspect of the invention, the first through-hole 41 and the second through-hole 42 of the link 2 are not communicated with each other (see FIG. 5). As shown in FIG. 17 and FIG. 18, however, the invention (the first and second aspects thereof) may also be arranged such that the first through-hole 41 and the second through-hole 42 are communicated with each other. According to modifications shown in FIG. 17 and FIG. 18, a communication portion R for intercommunicating the first through-hole 41 and the second through-hole 42 transects a partitioning portion 60 between the first through-hole 41 and the second through-hole 42 (see FIG. 5 and the like) in a longitudinal direction of the link.

The deformation of the link 2 is facilitated by providing the communication portion R for communication between the first through-hole 41 and the second through-hole 42. This is effective to lessen stress concentration on peripheral areas of the through-holes when the link receives a great force from the pin 3 or the strip 5. Thus, the link is increased in durability. The effect to lessen the stress concentration is particularly remarkable in a press-insertion chain wherein the pin or the strip is fixedly fitted in the link (fixing by press-insertion, shrink fitting, cold fitting or the like).

In these modifications, the communication portion R is disposed at place substantially intermediate the width of the through-holes 41, 42 with respect to a widthwise direction of the link. In the modification shown in FIG. 17, the communication portion R has a comparatively smaller width, whereas a communication portion R of a modification shown in FIG. 18 has a comparatively greater width. In the case where the communication portion R has the smaller width, the link has a higher rigidity than the case where the communication portion R has the greater width. Hence, a punching process for forming links may encounter less deformation of the links. In the case where the communication portion R has the greater width, the link 2 is more prone to deformation as compared with the case where the communication portion R has the smaller width. Hence, the effect to lessen the stress concentration is increased further. The width of the communication portion R may be decided properly according to the link dimensions, load conditions and the like.

As shown in FIG. 7, the through-holes 42, 42 individually function as a guide for guiding the pin 3 and the strip 5 in the movement in rolling contact (FIG. 7). In the case where the first through-hole 41 is communicated with the second through-hole 42, the communication portion R may be so disposed as not to impair such a guiding function. In order to maintain the guiding function, the communication portion R may preferably be formed in a manner to circumvent the contact surface (including all the areas contacting the through-hole during the aforesaid movement in rolling contact) where the pin 3 or the strip 5 contacts an inside surface of the through-hole 41 or 42. However, in a case where a guide member having the above guiding function is provided separately from the link, the communication portion R may be further increased in the width whereas the link may not include the aforesaid portion having the guiding function.

What is claimed is:
1. A power transmission chain entrainable between a first pulley possessing conical sheave surfaces and a second pulley possessing conical sheave surfaces, the power transmission chain comprising:
   a plurality of links each possessing through-holes;
   a plurality of pins inserted through the through-holes for interconnecting the plurality of links, the power transmission chain transmitting power by way of contact between opposite end faces of each of the pins and the sheave surfaces of the first and second pulleys; and a plurality of strips inserted through the through-holes for interconnecting the plurality of links, each strip contacting one of the plurality of pins in the corresponding through-hole, wherein all the plurality of pins substantially have the same length in the longitudinal direction thereof, and the plurality of pins include plural types of pins having different rigidities in the longitudinal direction thereof, and wherein the plurality of links include plural types of links comprising:

a first type of link possessing through-holes configured to receive strips and only pins of the same type having substantially the same rigidities; and a second type of link possessing through-holes configured to receive strips and pins of any of the plurality of pin types having different rigidities.

2. A power transmission chain according to claim 1, wherein each of the plurality of pins substantially has the same sectional shape and sectional area as determined at any point of the overall longitudinal length thereof, and the plurality of pins include said plural types of pins having different sectional areas.

3. A power transmission chain according to claim 2, wherein each of said plural types of pins has a different width with respect to a chain longitudinal direction compared to the other plural types of pins, the plurality of links include plural types of links having different pitches, and a link of the plurality of links having a greater pitch is penetrated by a pin of the plurality of pins having a greater width with respect to the chain longitudinal direction.

4. A power transmission chain according to claim 2, wherein out of the plural types of pins having different sectional areas, a sectional area of the thickest pin is 1.1 times or more and twice or less the sectional area of the thinnest pin.

5. A power transmission chain according to claim 1, wherein each of said plural types of pins has a different width with respect to a chain longitudinal direction compared to the other plural types of pins, the plurality of links include plural types of links having different pitches, and a link of the plurality of links having a greater pitch is penetrated by a pin of the plurality of pins having a greater width with respect to the chain longitudinal direction.

6. A power transmission chain according to claim 5, wherein out of the plural types of pins having different sectional areas, a sectional area of the thickest pin is 1.1 times or more and twice or less the sectional area of the thinnest pin.

7. A power transmission chain according to claim 1, wherein out of said plural types of pins having different sectional areas, a sectional area of a thickest pin of said plural types of pins is 1.1 times or more and twice or less a sectional area of a thinnest pin of said plural types of pins.

8. A power transmission assembly comprising:
a first pulley possessing conical sheave surfaces;
a second pulley possessing conical sheave surfaces; and
a power transmission chain according to claim 1 entrained between the first and second pulleys.

9. A power transmission chain according to claim 1, wherein opposite end faces of each of the strips do not contact the sheave surfaces of the first and second pulleys.

10. A power transmission chain entrainable between a first pulley possessing conical sheave surfaces and a second pulley possessing conical sheave surfaces, the power transmission chain comprising:

a plurality of links;

a plurality of pins for interconnecting the plurality of links, the power transmission chain transmitting power by way of contact between opposite end faces of each of the pins and the sheave surfaces of the first and second pulleys; and a plurality of strips for interconnecting the plurality of links, each strip contacting a corresponding one of the plurality of pins, wherein all the plurality of pins substantially have the same length in the longitudinal direction thereof, and the plurality of pins include plural types of pins having different sectional shapes or sectional areas as determined on a section perpendicular to the longitudinal direction thereof, and wherein the plurality of links include plural types of links comprising:

a first type of link possessing through-holes configured to receive strips and only pins of the same type having substantially the same rigidities; and a second type of link possessing through-holes configured to receive strips and pins of any of the plurality of pin types having different rigidities.

11. A power transmission chain according to claim 10, wherein each of the plurality of pins substantially has the same sectional shape and sectional area as determined at any point of the overall longitudinal length thereof, while the plurality of pins include plural types of pins having different sectional areas.

12. A power transmission chain according to claim 10, wherein each of said plural types of pins has a different width with respect to a chain longitudinal direction compared to the other plural types of pins, the plurality of links include plural types of links having different pitches, and a link of the plurality of links having a greater pitch is penetrated by a pin of the plurality of pins having a greater width with respect to the chain longitudinal direction.

13. A power transmission chain according to claim 10, wherein out of the plural types of pins having different sectional areas, a sectional area of the thickest pin is 1.1 times or more and twice or less the sectional area of the thinnest pin.

14. A power transmission chain according to claim 10, wherein said plural types of pins have different rigidities in the longitudinal direction thereof.

15. A power transmission chain according to claim 10, wherein opposite end faces of each of the strips do not contact the sheave surfaces of the first and second pulleys.

16. A power transmission chain entrainable between a first pulley possessing conical sheave surfaces and a second pulley possessing conical sheave surfaces, the power transmission chain including plural chain friction transmission members, the power transmission chain transmitting power by way of contact between opposite end faces of each of the plural chain friction transmission members and the sheave surfaces of the first and second pulleys, the chain friction transmission members arranged along a chain longitudinal direction at predetermined space intervals, the chain comprising:

a plurality of links each possessing first and second through-holes arranged in the chain longitudinal direction; and a plurality of first pins and a plurality of strips, each of the plurality of first pins and the plurality of strips penetrates the first through-hole of one link and the second through-hole of an adjacent link thereby interconnecting the links, adjoining in a chain widthwise direction, in a manner to provide bending in the chain longitudinal direction, wherein the first pin fixed in the first through-hole of the one link and movably fitted in the second through-hole of the other link and the strip movably fitted in the first through-hole of the one link and fixed in the second through-hole of the other link are brought into relative movement in rolling contact thereby permitting the bending of the chain, and wherein a locus of contact position between the first pin and the strip is defined by an involute of a circle and the plurality of first pins includes pins of two or more different widths in the chain longitudinal direction such that the first pins and the strips are combined to form two or more types of pairs which provide involutes of base circles having different radii, wherein the plural chain friction transmission members include plural types of chain friction transmission members which have mutually different rigidities against force acting in the chain widthwise direction, and wherein the first pin is a transmission pin also serving as the chain friction transmission member, and wherein the plurality of links include plural types of links comprising:

a first type of link possessing through-holes configured to receive strips and only pins of the same type having substantially the same rigidities; and a second type of link possessing through-holes configured to receive strips and pins of any of the plurality of pin types having different rigidities.

17. A power transmission chain according to claim 16, wherein all the chain friction transmission members substantially have the same length in the longitudinal direction thereof.

18. A power transmission chain according to claim 17, wherein the plural chain friction transmission members include plural types of chain friction transmission members having different sectional shapes or sectional areas as determined on a section perpendicular to the chain widthwise direction.

19. A power transmission chain according to claim 16, wherein the plural chain friction transmission members include plural types of chain friction transmission members having different sectional shapes or sectional areas as determined on a section perpendicular to the chain widthwise direction.

20. A power transmission chain according to claim 16, wherein the plural transmission pins include plural types of transmission pins having different chain-longitudinal widths as determined on a section perpendicular to a pin-longitudinal direction, and wherein the plurality of links include plural types of links having different pitches.

21. A power transmission chain according to claim 16, wherein opposite end faces of each of the strips do not contact the sheave surfaces of the first and second pulleys.

\* \* \* \* \*